United States Patent
Hanson et al.

(10) Patent No.: US 11,628,383 B2
(45) Date of Patent: Apr. 18, 2023

(54) SETTLER WITH A SETTLER PLATE THAT INCLUDES A HOLLOW SUPPORT

(71) Applicant: MEURER RESEARCH INC., Golden, CO (US)

(72) Inventors: Christopher D. Hanson, Arvada, CO (US); Galen J. M. Fitzpatrick, Denver, CO (US); Donald F. Bersell, Denver, CO (US)

(73) Assignee: MEURER RESEARCH INC., Golden, CO (US)

( * ) Notice: Subject to any disclaimer, the term of this patent is extended or adjusted under 35 U.S.C. 154(b) by 0 days.

(21) Appl. No.: 17/360,767

(22) Filed: Jun. 28, 2021

(65) Prior Publication Data
US 2021/0322899 A1 Oct. 21, 2021

Related U.S. Application Data

(63) Continuation of application No. 16/862,352, filed on Apr. 29, 2020, now Pat. No. 11,045,749, which is a
(Continued)

(30) Foreign Application Priority Data

Nov. 27, 2019 (CA) .............................. CA 3062774

(51) Int. Cl.
*B01D 21/00* (2006.01)
(52) U.S. Cl.
CPC ..... *B01D 21/0045* (2013.01); *B01D 21/0003* (2013.01); *B01D 21/0042* (2013.01); *B01D 21/0069* (2013.01)

(58) Field of Classification Search
CPC ............ B01D 21/0045; B01D 21/0006; B01D 21/02; B01D 21/2427
(Continued)

(56) References Cited

U.S. PATENT DOCUMENTS 3,963,624 A 6/1976 Henderson et al.
4,089,782 A 5/1978 Huebner
(Continued)

FOREIGN PATENT DOCUMENTS

EP 0836876 A1 * 4/1998 ......... B01D 21/0042

OTHER PUBLICATIONS

Official Action for U.S. Appl. No. 29/669,960, dated Dec. 3, 2021 6 pages Restriction Requirement.
(Continued)

*Primary Examiner* — Nam X Nguyen
*Assistant Examiner* — Ekandra S. Miller-Cruz
(74) *Attorney, Agent, or Firm* — Sheridan Ross P.C.

(57) ABSTRACT

The present disclosure relates to settler plates for a plate settler. The settler plates generally include a hollow support with a hollow interior to receive clarified liquid from a flow channel between adjacent settler plates. An orifice is formed through the hollow support to direct clarified liquid from the flow channel into the hollow interior. The orifice can be positioned such that clarified liquid can flow upwardly out of the flow channel and downwardly through the orifice into the hollow interior. The hollow support can be integrally formed with the settler plate. For example, the hollow support can be formed by bending a tab extending from an end of the settler plate. The tab can be bent into a hollow support with a cross section that is generally polygonal.

20 Claims, 19 Drawing Sheets

Related U.S. Application Data continuation-in-part of application No. 16/208,262, filed on Dec. 3, 2018, now Pat. No. 10,881,988.

(58) Field of Classification Search
USPC .......................................................... 210/521
See application file for complete search history.

(56) References Cited

U.S. PATENT DOCUMENTS

| | | | |
|---|---|---|---|
| 4,120,796 | A | 10/1978 | Huebner |
| 4,136,012 | A | 1/1979 | Louboutin et al. |
| 4,157,969 | A | 6/1979 | Thies |
| 4,221,671 | A | 9/1980 | Meurer |
| 4,747,196 | A | 5/1988 | Moir |
| 4,889,624 | A | 12/1989 | Soriente et al. |
| 5,049,278 | A | 9/1991 | Galper |
| 5,116,443 | A | 5/1992 | Meurer |
| 5,378,378 | A | 1/1995 | Meurer |
| 5,391,306 | A | 2/1995 | Meurer |
| 6,245,243 | B1 | 6/2001 | Meurer |
| 6,783,009 | B1 | 8/2004 | Meurer |
| 6,817,476 | B2 | 11/2004 | Donnick, Jr. et al. |
| 6,836,948 | B2 | 1/2005 | Wang |
| 6,971,398 | B1 | 12/2005 | Brauch et al. |
| 7,314,572 | B1 | 1/2008 | Meurer |
| 7,850,860 | B2 | 12/2010 | Dissinger et al. |
| 7,927,485 | B2 | 4/2011 | Roberts et al. |
| 8,585,896 | B2 | 11/2013 | Roberts et al. |
| 8,945,401 | B2 | 2/2015 | Cook et al. |
| 9,327,999 | B1 | 5/2016 | Philbrook et al. |
| 9,415,397 | B1 * | 8/2016 | Christodoulou ... B01D 21/0069 |
| 9,656,188 | B2 | 5/2017 | Cook et al. |
| 9,993,747 | B2 | 6/2018 | Brauch et al. |
| 10,881,988 | B2 | 1/2021 | Hanson et al. |
| 11,045,749 | B2 | 6/2021 | Hanson et al. |
| 2004/0149648 | A1 * | 8/2004 | Donnick, Jr. ...... B01D 21/0075 210/522 |
| 2006/0171785 | A1 | 8/2006 | McGinn et al. |
| 2008/0314823 | A1 | 12/2008 | Kulick, III et al. |
| 2012/0312741 | A1 | 12/2012 | Pashaian et al. |
| 2017/0050124 | A1 | 2/2017 | Feldthusen |

OTHER PUBLICATIONS

Notice of Allowance for U.S. Appl. No. 29/669,960, dated Feb. 24, 2022 7 pages.
U.S. Appl. No. 29/669,960, filed Nov. 13, 2018, Hanson et al.
"Plate Settler Technology," Meurer Research Inc., 2018, retrieved from http://www.meurerresearch.com/literaturemedia/technical-information/plate-settler-technology, 3 pages.
"Plate Settlers: The High-Capacity Inclined Plate Settler System," Meurer Research Inc., 2011, retrieved from http://www.meurerresearch.com/wp-content/uploads/2011/04/platesettler.pdf?x78409, 6 pages.
Swisher "JMS Plate Settlers Brochure," Jim Myers & Sons, Inc., Oct. 2009, 4 pages.
Official Action for U.S. Appl. No. 16/208,262, dated Feb. 27, 2020, 6 pages. Restriction Requirement.
Official Action for U.S. Appl. No. 16/208,262, dated May 12, 2020, 22 pages.
Notice of Allowance for U.S. Appl. No. 16/208,262, dated Sep. 1, 2020, 10 pages.
Official Action for U.S. Appl. No. 16/862,352, dated Jul. 16, 2020, 5 pages. Restriction Requirement.
Official Action for U.S. Appl. No. 16/862,352, dated Oct. 2, 2020, 26 pages.
Notice of Allowance for U.S. Appl. No. 16/862,352, dated Feb. 25, 2021 8 pages.

* cited by examiner

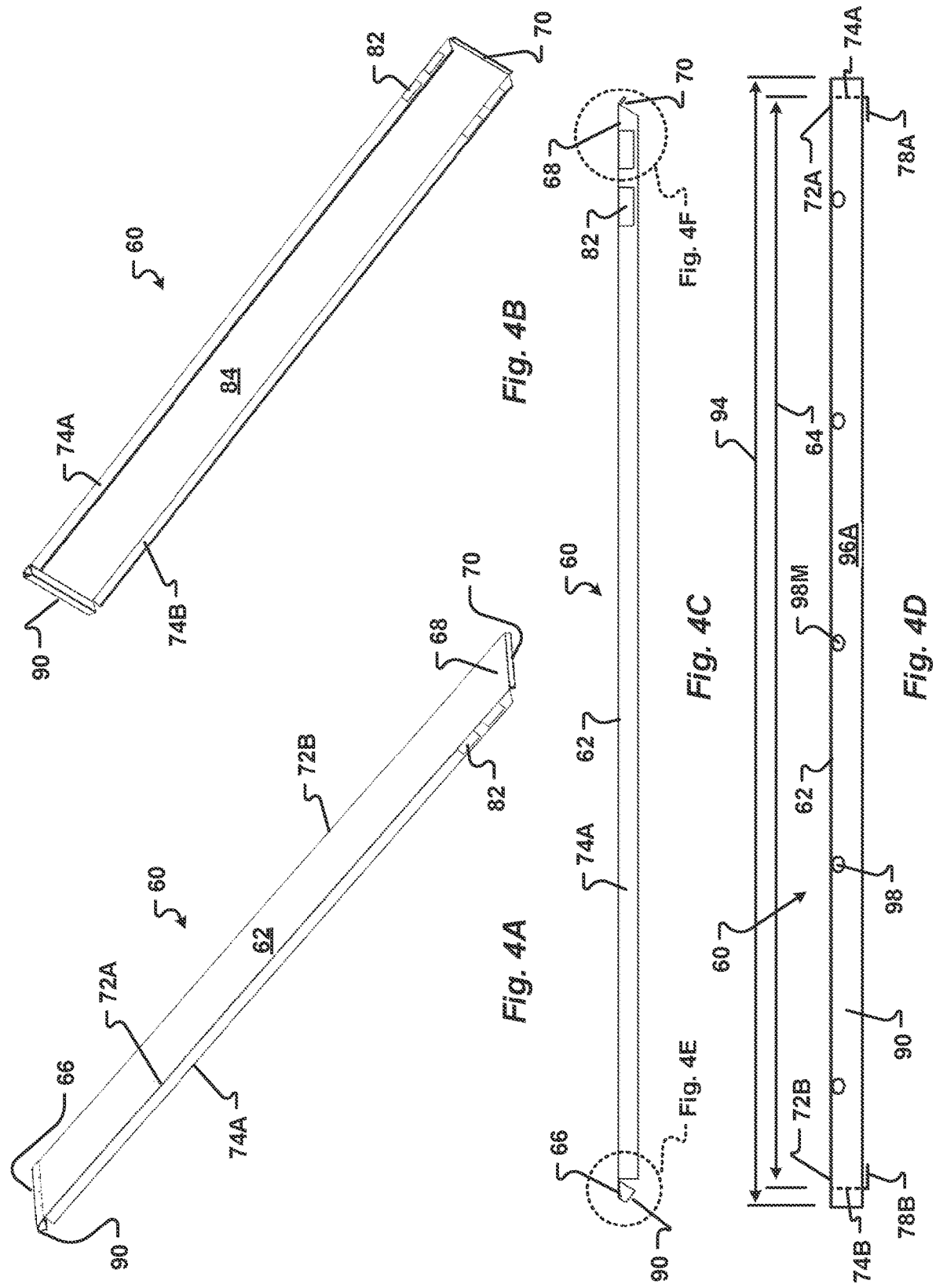

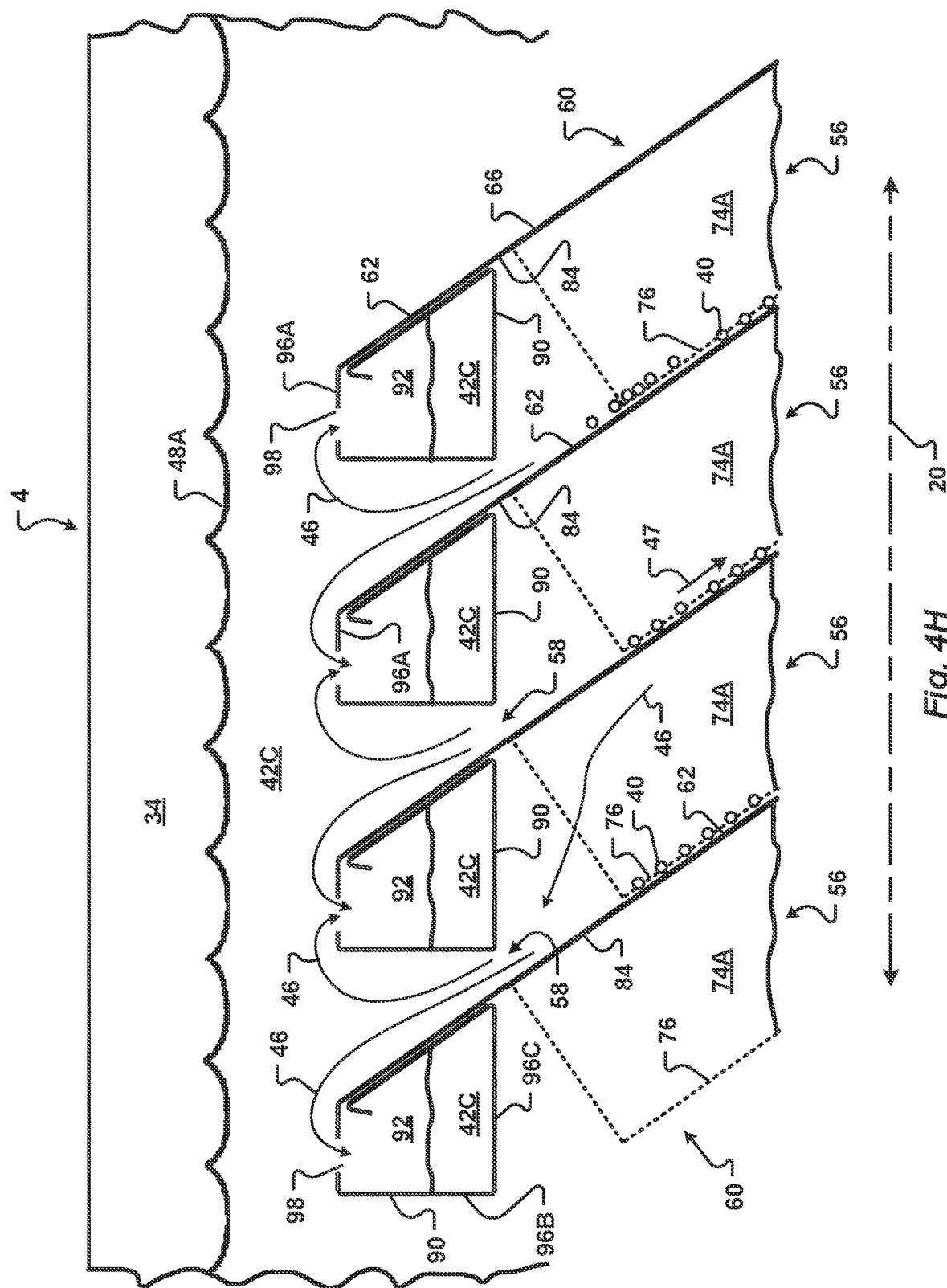

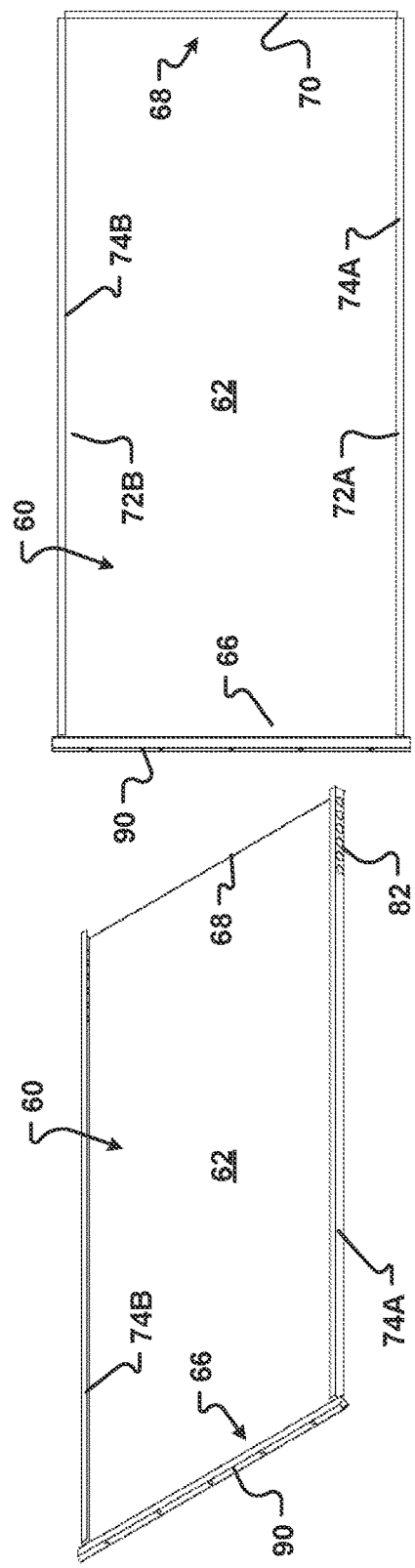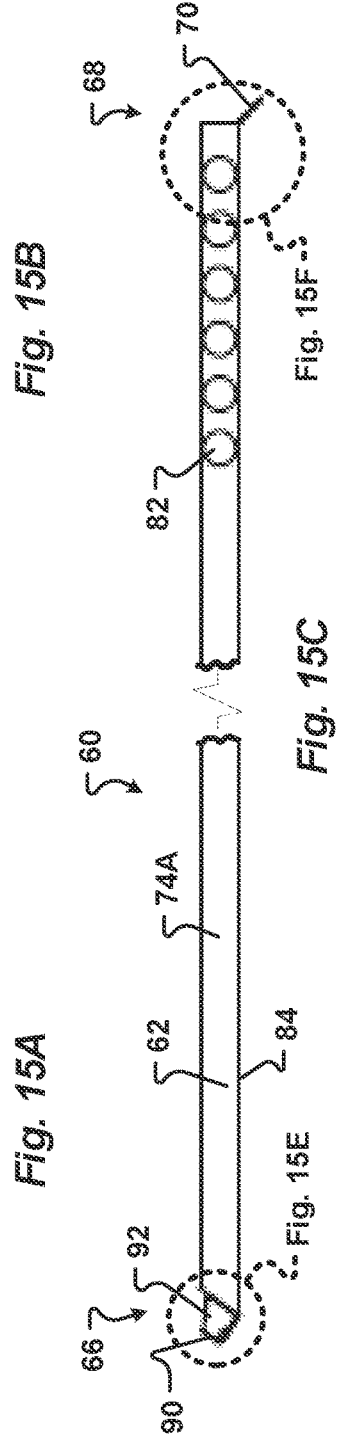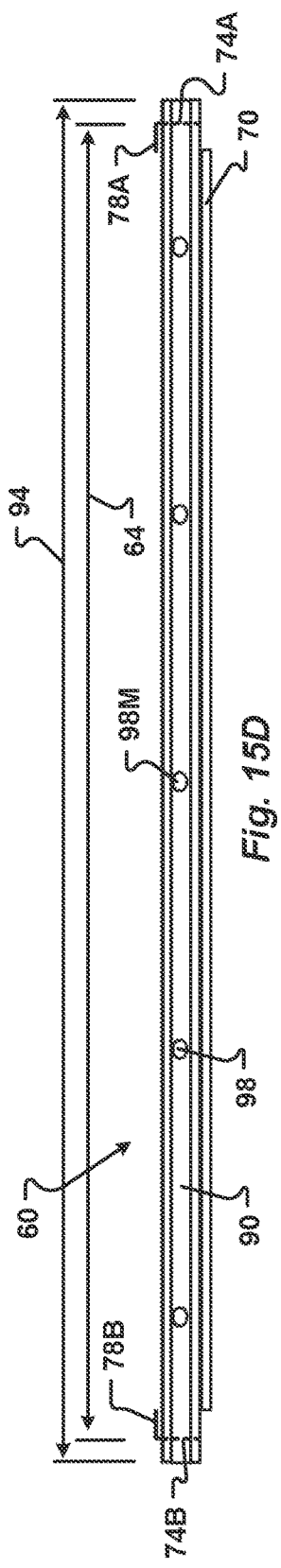

SETTLER WITH A SETTLER PLATE THAT INCLUDES A HOLLOW SUPPORT

CROSS-REFERENCE TO RELATED APPLICATIONS

This application is a Continuation of Ser. No. 16/862,352, filed on Apr. 29, 2020, which issued as U.S. Pat. No. 11,045,749 on Jun. 29, 2021, which is a Continuation-in-Part application and claims the benefit and priority of U.S. patent application Ser. No. 16/208,262, filed Dec. 3, 2018, issued as U.S. Pat. No. 10,881,988, entitled "Settler with a Settler Plate that Includes a Hollow Support," and also claims the benefit of Canadian Patent Application No. 3,062,774 filed Nov. 27, 2019, which are each incorporated herein in their entirety by reference.

FIELD

The present disclosure relates to apparatus and methods for promoting settling of solids from waste-water, and more particularly to a settler that includes settler plates. Each settler plate is provided with a hollow support for clarified liquid flowing from an individual flow channel defined by adjacent settler plates. The hollow support can be integrally formed with the settler plate.

BACKGROUND

Clarifiers (also known as "settlers" or "plate settlers") are used to remove certain materials and particles from liquid or waste-water. These materials are generally suspended in the liquid and can be removed under the force of gravity when the flow of the liquid is substantially reduced, as in a very low flow, or quiescent zone in the clarifier. The quiescent zone can be within a flow channel of the clarifier. Since these materials are generally solid and are said to "settle" out of the liquid, they are referred to as "settleable solids". Such settleable solids may include any undesired material including naturally occurring materials (e.g., clay, silts, sand and dirt), chemical precipitants and biological solids or waste products. The word "solids" as used herein refers to such settleable solids.

Clarifiers are used, for example, in water and wastewater treatment plants. In water treatment, the water drawn from a water supply has various non-settleable colloidal solids therein. When mixed with chemicals, the colloidal solids and chemicals agglomerate to form solids. In wastewater treatment, the solids include organic solids, among other wastes. Water and wastewater are treated in clarifiers to remove such solids, thereby making the water clear and suitable for use, reuse, or for further treatment, such as tertiary treatment. The word "liquid" as used herein refers to water and wastewater.

An object of water and wastewater clarifiers is to create quiescent zones having low flow rates to promote maximum settlement of solids to the bottom of the clarifiers. Clarifiers typically include a large detention basin where the settlement of the solids occurs. Flat plates mounted at fixed angles relative to the surface of the liquid have been used to form multiple thin liquid flow channels. The plates can be held in the clarifier by supports which are generally connected to the tops of the plates, for example, by welding the supports to the plates. Adjacent supports attached to a pair of adjacent plates define a flow channel within the detention basin in an attempt to promote settling of solids. The liquid containing the solids flows upwardly in the flow channels between the plates at flow rates that generally allow sufficient time for most of the solids to settle onto the plates. Ideally, the solids then slide down the plates to the bottom of the detention basin for collection. After the solids have settled, the liquid without the settled solids is referred to as the "clarified liquid". The clarified liquid flows upwardly past the tops of the plates and the supports from each of the separate flow channels and combines to form one or more common volumes of clarified liquid above the tops of the plates and the supports. Thus, the clarified liquid from the separate flow channels may commingle and mix in the common volumes. The common volumes of clarified liquid generally flows to an outlet at a lateral end of the plates and exits the basin.

As an example, U.S. Pat. No. 4,889,624 describes plates that are supported by a frame to define separate flow channels of a clarifier. Each flow channel is defined by adjacent plates. Tops of the plates are provided with legs that tend to close the upper end of each of the flow channels. To allow the clarified liquid to flow out of the flow channels, orifices are provided in settling surfaces of the plates. The clarified liquid flowing out of one flow channel flows through the orifices of that channel, rises and joins clarified liquid flowing out of the other flow channels. Then the clarified liquid from all of the flow channels flows laterally over the edge of the frame to an outlet trough of the basin. U.S. Pat. No. 4,889,624 is incorporated herein by reference in its entirety.

Another clarifier system is described in U.S. Pat. No. 7,850,860 which is incorporated herein by reference in its entirety. The clarifier system of the '860 patent includes angular support members which are attached to settling surfaces of plates. The angular support members support the plates in the clarifier system such that adjacent plates define an upward flow channel with a settling surface there between. An angular support member of a plate is positioned to define a gap spaced from a settling surface of an adjacent plate. Adjacent angular support members define a v-shaped lateral flow channel for each upward flow channel. A weir assembly includes v-notches associated with each v-shaped lateral flow channel. The v-notches of the weir assembly include vertexes that are higher than the angular support members such that the plates are submerged beneath the weir assembly during operation of the clarifier system. Accordingly, clarified liquid flowing out of the channels builds up above the channels until it flows through the v-notches of the weir assembly.

Another example of a clarification system is generally described in U.S. Pat. No. 8,585,896 which is incorporated herein by reference in its entirety. The clarification system includes inclined settling plates that rest upon support members. Adjacent settling plates define flow channels for liquid. The settling plates include an upper flange that is configured to contact an adjacent settling plate closing the upper ends of the flow channels. The liquid passes out of the channels through orifices formed in a body or the flange of the settling plates and then flows to an effluent trough.

Some of the supports in these clarifiers are welded or otherwise attached to the settling plates. Attaching the supports to the settling plates in this manner increases the time and expense required to fabricate the settling plate. Further, the weld or attachment between the settling plate and the support may fail due corrosion that results from immersion in water.

Additionally, the supports used with some of the settling plates are relatively weak. More specifically, some prior art supports do not have sufficient strength to permit operators to walk on upper ends of the plates for installation, inspection and maintenance. Accordingly, accessing plates of some prior art settlers is difficult, increasing the time required by operators to install, inspect, and service prior art settlers.

In many prior art clarifiers, the clarified liquid flowing from each channel defined by adjacent plates joins together in a common volume above the plates. The clarified liquid then flows laterally to an outlet of the basin. This type of clarifier concentrates the flow of clarified liquid at an exit point at one or both of the lateral sides of the plates and can create uneven liquid velocities within the channels across the widths of the plates. More specifically, the liquid may flow upwardly faster near the lateral sides of the plates. The flow of liquid may decrease toward the middle of the plates as clarified liquid collects above the middle of plates. This uneven flow of liquid and the reduced liquid velocity can decrease the efficiency of the clarifier. Another problem that arises when the clarified liquid from multiple channels joins into a common volume is that it is difficult, or impossible, to isolate liquid from one channel for testing to determine the performance of the channel and whether plates defining the channel require maintenance or replacement.

Still another problem with prior art settler plates is that the position of a support associated with a settler plate may disrupt or alter the flow of liquid within a flow channel. For example, in some prior art settler plates, a support element is joined or attached to the settling surface of the settler plate. Other prior art settler plates include a support element that projects at least partially above the settling surface. Liquid flowing upwardly in the flow channel must alter direction to flow around the support element. This can create turbulence or eddies within the flow channel and can disrupt the upward flow of the liquid decreasing the efficiency of the settler plate.

Accordingly, there is a need for an improved settler plate and systems and methods of positioning settler plates within a clarifier which reduce or eliminate one or more of the disadvantages of prior art settler plates.

SUMMARY

One aspect of the present disclosure is a hollow support that does not disrupt the flow of liquid along a settling surface of a settler plate. The hollow support can be positioned such that the hollow support does not project above the settling surface. In one embodiment, the hollow support is integrally formed with the settler plate. The hollow support can extend from a back surface of the settler plate, the back surface being opposite to the settling surface.

Another aspect of the present disclosure is a settler plate for a clarifier. The settler plate includes a support with a hollow interior. The support can be integrally formed with the settler plate. In one embodiment, the support can be formed by rolling or bending a portion of the settler plate one or more times.

The hollow interior of the support is configured to collect clarified liquid from a channel of the clarifier. More specifically, the settler plate includes an inlet or orifice for clarified liquid to flow from the channel into the hollow interior within the support.

In one embodiment, the orifice is positioned to collect a substantial amount, if not all, of the flow of the clarified liquid from the channel without mixing of the flow with clarified liquid from other channels of the clarifier. As a result, the flow of clarified liquid from a flow channel can be substantially, or completely, isolated. Accordingly, in one embodiment, the flow from the channels of the clarifier can be individually sampled for examination of the performance of the separate flow channels. If too many solids are identified in liquid from a channel, one or both of the settler plates that define the channel can be removed from the clarifier for service or replacement. In this manner, it is possible to identify individual channels and the associated settler plates than require cleaning or replacement.

Another aspect of the present disclosure is to provide a settler plate with sufficient strength to support a technician. The settler plate includes a settling surface that is generally rectangular. A hollow support is positioned proximate to an upper end of the settler plate. The hollow support can be integrally formed with the settler plate. The hollow support is configured to receive clarified liquid from a channel formed between the settler plate and an adjacent settler plate. Clarified liquid within the hollow support can be directed laterally within the hollow support to a trough.

In one embodiment, the hollow support is formed by bending or rolling an end tab of the settler plate. The hollow support can have any shape. In one embodiment, the hollow support has a cross-section that is generally round. Optionally, the hollow support can have two or more sides such as a regular or irregular polygon. For example, the hollow support can have a cross-section that is generally triangular or square. In one embodiment, the hollow support has a cross-sectional shape of a quadrilateral or four-sided polygon. The hollow support can have a cross-section of a trapezoid.

The settler plate includes an orifice to direct clarified liquid into a hollow interior of the hollow support. The orifice can be formed at an upper end of the hollow support. Optionally, the orifice can be formed through a settling surface of the settler plate. In one embodiment, the orifice is formed through a portion of the hollow support configured to face the adjacent settler plate. In one embodiment, at least one orifice is formed within a middle third of the width of the settling surface. In this manner, clarified liquid can enter the hollow support from a median portion or width of a channel.

In one embodiment, the hollow support is formed such that liquid flowing along the settling surface of the settler plate does not have to flow around the hollow support. More specifically, in one embodiment, the hollow support does not project in front of the settling surface. The hollow support can be formed to extend from a back surface of the settler plate.

A flange or baffle is provided at each lateral side of the settler plate. The baffle can be integrally formed with the settler plate. For example, in one embodiment, the baffle is formed by bending a lateral tab of the settler plate. A distal portion of the baffle is configured to contact a settling surface of the adjacent settler plate. In one embodiment, the baffle defines a distance separating the settler plate from the adjacent settler plate. In this manner, the baffle can define a height of a channel between the settler plate and the adjacent settler plate.

A port for effluent can be formed through the baffle. The port can be formed proximate to the settling surface of the settler plate. More specifically, in one embodiment, the port is spaced from the distal portion of the baffle. In this manner, the port can be a predetermined distance from the settling surface of the adjacent settler plate. For example, a distance between an upper edge of the port and the settling surface can be less than the distance between a lower edge of the port and the distal portion of the baffle. The port can be of any size and shape. In one embodiment, the port is generally rectangular. Optionally, the port is round or oval. Two or more ports can be formed in each baffle.

Optionally, a flange is formed at the distal portion of the baffle. The flange can be substantially parallel to the settling surface. In one embodiment, the flange extends inwardly from the distal portion and under the settling surface of the settler plate. The flange can be formed by a second bend of the lateral tab of the settler plate A stiffening feature can extend from a lower end of the settler plate. The stiffening feature can be integrally formed with the settler plate. In one embodiment, the stiffening feature is formed by rolling or bending a lower tab of the settler plate. The stiffening feature can be configured to contact a support surface of a basin or frame holding the settler plate. In one embodiment, the stiffening feature has a generally rectangular shape. The stiffening feature can optionally include a hollow interior. One or more corners of the stiffening feature can be rounded. Alternatively, the stiffening feature can have a generally round shape. In one embodiment, the stiffening feature is formed by rolling the lower tab into a spiral.

Another aspect of the present disclosure is to provide an apparatus for clarifying liquid in which solids are suspended. The apparatus generally includes one or more of: (1) a clarifier for containing the liquid and the solids; and (2) a pair of settler plates spaced along a longitudinal axis of the clarifier to define a channel, each of the settler plates including a settling surface, a baffle at a lateral side, a stiffening feature at a lower end, and a hollow support proximate to an upper end, the hollow support integrally formed with the settler plate and including at least two segments, a hollow interior, and an orifice for liquid flowing from the channel to enter into the hollow interior, the hollow interior configured to direct liquid to a trough of the clarifier. The pair of settler plates can be positioned in the clarifier at a predetermined angle. Optionally, the settler plates can be positioned such that the settling surfaces are inclined at an angle of between approximately 30° and approximately 40° to a vertical axis.

In one embodiment, the hollow support is not welded to the settler plate. The hollow support can be formed by bending a tab extending from the settler plate at least two times. Accordingly, the hollow support and the settler plate can be formed from a single piece of metallic material. In one embodiment, the hollow support extends away from a plane defined by the settling surface. The plane can be in contact with the settling surface. Accordingly, in one embodiment, the hollow support does not contact the plane.

In one embodiment, the at least two segments of the hollow support include a first segment extending away from the settling surface, a second segment extending from the first segment, and a third segment extending from the second segment toward a back surface of the settler plate. The first segment is joined to the upper end of the settler plate at a first vertex. A first interior angle of the hollow support between the back surface and the first segment can be greater than 90°. The first interior angle can be between approximately 115° and approximately 140°. In one embodiment, the first interior angle is selected such that the first segment is approximately horizontal when a settler plate is positioned in the clarifier. A first radius of curvature can be formed between the upper end of the settler plate and the first segment. In one embodiment, the first radius of curvature is between approximately 2/16 (or 1/8) inches and 4/16 (or 1/4) inches.

A second interior angle between the first segment and the second segment can be between approximately 80° and 100°, or approximately 90°. A second radius of curvature between the first segment and the second segment can be between approximately 2/8 (or 1/4) inches and 4/8 (or 1/2) inches.

Additionally, or alternatively, a third interior angle between the second segment and the third segment is between approximately 80° and 100°, or approximately 90° in one embodiment. The third segment can be oriented relative to the second segment such that the third segment is approximately horizontal when the settler plate is positioned in the clarifier. Optionally, the third segment can be approximately parallel to the first segment. The hollow support can have a third radius of curvature between the second segment and the third segment. The third radius of curvature can be between approximately 1/32 inches and 5/32 inches.

Optionally, the hollow support can further include a fourth segment extending from the third segment. The fourth segment can extend toward the first segment within the hollow interior of the hollow support. In one embodiment, the fourth segment can be approximately parallel to the back surface of the settler plate. Additionally, or alternatively, the fourth segment can contact the back surface. Optionally, the fourth segment is joined to the back surface. For example, the fourth segment can be joined to the back surface by mechanical fastener. The mechanical fastener can be a rivet or a similar fastener. In one embodiment, at least one rivet extends from the settling surface of the settler plate through fourth segment of the hollow support.

The hollow support can optionally include a fifth segment extending from the fourth segment. The fifth segment includes a free end extending into the hollow interior of the hollow support.

One or more of the first, second, third, fourth, and fifth segments can be generally planar. Optionally, at least one of the first through fifth segments is not planar. For example, at least one of the first, second, third, fourth, and fifth segments can have a curved or arched surface.

The orifice is positioned such that at least some liquid can enter the hollow interior through the orifice before moving laterally to the trough. The trough is positioned proximate to at least one lateral side of the settler plate. The orifice can be positioned such that liquid can flow upwardly past an upper end of the settling surface and then downwardly through the orifice into the hollow interior of the hollow support. In one embodiment, the orifice is formed through the first segment of the hollow support. Optionally, the hollow support can include a plurality of orifices. At least one of the plurality of orifices can be formed in a medial portion of the hollow support. Each of the orifices can have a shape that is selected from a circle, a triangle, a square, and a rectangle.

The stiffening feature can be integrally formed with the settler plate from a single piece of metallic material. For example, the stiffening feature can be formed by bending a lower tab extending from a lower end of the settler plate. The lower tab can be bent or folded two or more times to form the stiffening feature. In one embodiment, a first segment of the lower tab is bent or folded back at an angle of approximately 180° toward a second segment of the lower tab to form the stiffening feature. In this manner, the first segment of the stiffening feature is approximately parallel to the second segment of the stiffening feature. A free end of the first segment can be oriented toward the back surface of the settler plate.

The stiffening feature can be angled away from the settling surface. In one embodiment, the stiffening feature is oriented at an angle of between approximately 25° and approximately 55° below the settling surface.

The baffle can include a flange. The flange can be oriented at an angle of at least approximately 90° to the baffle. In one embodiment, the flange is approximately parallel to the settling surface. The flange of a first one of the pair of settler plates is configured to contact a settling surface of a second one of the pair of settler plates. In one embodiment, a free end of the baffle is angled away from the settling surface. In this manner, when the flange of the first one of the settler plates contacts the settling surface of the second one, the flange can apply a biasing force to the settling surface to form a seal to prevent the flow of liquid between the flange and the settling surface.

One aspect of the present disclosure is to provide apparatus for clarifying liquid in which solids are suspended, comprising: (1) a frame; and (2) a plurality of settler plates spaced along a longitudinal axis of the frame to define a plurality of channels, each of the settler plates including a settling surface, a baffle at a lateral side, a stiffening feature at a lower end, and a hollow support proximate to an upper end, the hollow support integrally formed with the settler plate and including a hollow interior and an orifice for liquid flowing upwardly from a channel to enter into the hollow interior, the hollow interior configured to direct liquid laterally to a trough. In one embodiment, the settler plate and the hollow support are formed from a single piece of a stainless steel alloy without welding.

The orifice can be positioned such that liquid can flow upward past the upper end and then downward through the orifice into the hollow interior. In this manner at least some liquid can enter the hollow interior through the orifice before moving laterally to the trough.

The hollow support can include a first segment extending away from the settling surface, a second segment extending from the first segment, and a third segment extending from the second segment toward a back surface of the settler plate. In one embodiment, the first segment extends away from a plane defined by the settling surface at an angle of between approximately 50° and approximately 60°. The second segment can extend from the first segment at an angle of between approximately 80° and 100°. Additionally, the third segment may extend from the second segment at an angle of between approximately 80° and approximately 100°.

Optionally a first radius of curvature between the upper end of the settler plate and the first segment can be between approximately 1/8 inches and 1/4 inches. Additionally, a second radius of curvature between the first segment and the second segment may be between approximately 1/4 inches and 1/2 inches. In one embodiment, a third radius of curvature between the second segment and the third segment is between approximately 1/32 inches and 5/32 inches.

The hollow support optionally can include a fourth segment extending from the third segment, the fourth segment being approximately parallel to the back surface. In one embodiment, the fourth segment is joined to the back surface.

The baffle can include a flange. A flange of a first settler plate is configured to contact a settling surface of a second adjacent settler plate.

In one embodiment, the frame is configured to receive at least 30 settler plates. Each settler plate can be fixed to the frame with the settling surface inclined upwardly at an angle of between approximately 50° and 65° relative to a horizontal axis of the frame.

It is another aspect of the present disclosure to provide a settler plate for a plate pack, comprising: (1) a settling surface that is generally rectangular; (2) a baffle at a lateral side of the settler plate; (3) a stiffening feature at a lower end of the settler plate; (4) a hollow support extending from a back surface of the settling surface, the hollow support having a hollow interior configured to transport liquid laterally; and (5) an orifice for liquid to enter the hollow support. The settling surface can be substantially planar. Optionally, the hollow support can have a width that is greater than a width of the settling surface. In one embodiment, the hollow support extends away from a plane defined by the settling surface. The plane can be in contact with the settling surface. Accordingly, in one embodiment, the hollow support does not contact the plane.

The hollow support can be integrally formed with the settler plate. For example, the hollow support can be formed by bending or folding a tab extending from an end of the settling surface. The tab can be bent two or more times to form the hollow support. The hollow support and the settler plate can be formed from a single piece of a metallic material.

The hollow support has a cross-sectional shape that can be one of a circle, an ellipse, a triangle, a square, a rectangle, and a polygon with three, four, five or more sides. The hollow support can include a first segment extending away from the settling surface, a second segment extending from the first segment, and a third segment extending from the second segment toward the back surface of the settler plate.

The first segment has a first length, the second segment has a second length, and the third segment has a third length. The first length can be less than the second length. The second length can be less than the third length.

In one embodiment, a first interior angle between the settling surface and the first segment is between approximately 115° and approximately 135°. In another embodiment, the first segment is oriented such that when the settling surface of the settler plate is inclined at an angle of between approximately 30° and 35° relative to a vertical axis the first segment will be approximately horizontal. A second interior angle between the first segment and the second segment can be between approximately 80° and approximately 100°. The hollow support can also include a third interior angle between the third segment and the second segment. The third interior angle can be between approximately 80° and approximately 100°. Optionally, the third segment can be approximately parallel to the first segment.

A first radius of curvature can be formed between the settling surface and the first segment. In one embodiment, the first radius of curvature is between approximately 2/16 (or 1/8) inches and 4/16 (or 1/4) inches. A second radius of curvature between the first segment and the second segment can be between approximately 2/8 (or 1/4) inches and 4/8 (or 1/2) inches. In one embodiment, the hollow support has a third radius of curvature between the second segment and the third segment. The third radius of curvature can be between approximately 1/32 inches and 5/32 inches.

The hollow support can further include a fourth segment extending from the third segment. The fourth segment can be oriented toward the first segment. Optionally, the fourth segment is generally parallel to the settling surface. In one embodiment, the fourth segment contacts the back surface. The fourth segment optionally is joined to the back surface. For example, a mechanical fasten can extend through the setting surface into the fourth segment. The mechanical fastener can be a rivet.

Additionally, the hollow support can include a fifth segment. The fifth segment can extend from the optional fourth segment into the hollow interior. In one embodiment, the fifth segment is oriented transverse to the first segment.

One or more of the first, second, third, fourth, and fifth segments can be generally planar. Optionally, at least one of the first through fifth segments is not planar. For example, at least one of the first, second, third, fourth, and fifth segments can have a curved or arched surface.

The stiffening feature can be integrally formed with the settler plate. For example, the stiffening feature can be formed by bending a lower tab extending from a lower end of the settling surface. The lower tab can be bent two or more times to form the stiffening feature. In one embodiment, a free end of the lower tab is bent back at an angle of approximately 180° to form the stiffening feature. In this manner, a first segment of the stiffening feature is generally parallel to a second segment of the stiffening feature. A free end of the lower tab can be oriented toward the back surface of the settling surface.

The stiffening feature can be oriented at an angle relative to the plane defined by the settling surface. In one embodiment, the stiffening feature is oriented at an angle of between approximately 25° and approximately 55° below the plane defined by the settling surface.

Still another aspect of the present disclosure is to provide a method of forming a settler plate. The method includes, but is not limited to, one or more of: (1) providing a blank including a first end tab, a second end tab, and lateral tabs; (2) folding or bending the first end tab at least two times to form a hollow support that extends from a back surface of the settler plate; (3) folding or bending the second end tab at least two times to form a stiffening feature at a lower end of the settler plate; and (4) folding or bending the lateral tabs to form a baffle at each lateral side of the settler plate. The blank can be a stainless steel alloy.

Folding the first end tab can include forming the hollow support into a polygonal shape. For example, in one embodiment folding the first end tab further comprises: (i) forming a first segment of the hollow support that extends away from the back surface; (ii) forming a second segment that extends away from the first segment; and (iii) forming a third segment that extends from the second segment and toward the back surface. The first segment can extend from the back surface at an angle of between approximately 115° and approximately 140°. A first radius of curvature can be formed between the back surface of the settler plate and the first segment. The first radius of curvature can be between approximately $2/16$ (or $1/8$) inches and $4/16$ (or $1/4$) inches.

The second segment may extend from the first segment at an angle of between approximately 80° and 100°. A second radius of curvature between the first segment and the second segment can be between approximately $2/8$ (or $1/4$) inches and $4/8$ ($1/2$) inches.

Optionally, forming the second segment can include: (a) folding the first end tab to form a first angle between the second segment and the third segment; (b) forming the first segment; and (c) altering the first angle between the second segment and the third segment. In one embodiment, the first angle is approximately 135°. Optionally, the first angle is decreased to approximately 90° after the angle is altered.

The third segment can extend from the second segment at an angle of between approximately 80° and approximately 100°. The first and third segments can be approximately parallel. In one embodiment, a third radius of curvature is formed between the second segment and the third segment. The third radius of curvature can be between approximately $1/32$ inches and $5/32$ inches.

The method can include forming a fourth segment that extends from the third segment. The fourth segment can be oriented generally parallel to the back surface. Optionally, the method can further include joining the fourth segment to the back surface. In one embodiment, the joining includes driving a mechanical fastener through the fourth segment and the back surface. The mechanical fastener can be a rivet.

The method may further include folding the lateral tabs to form a flange at a distal end of each of the baffles. In one embodiment, the flanges can extend approximately parallel to the back surface. In another embodiment, each flange is oriented at an angle of at least 90° to an associated baffle.

In one embodiment, the blank comprises a planar central sheet that is generally rectangular. The central sheet can include a first narrow end, a second narrow end, and two lateral sides. The first end tab can extend from the first narrow end, the second end tab can extend from the second narrow end, and a lateral tab can extend from each of the two lateral sides. The blank can also include a notch formed between each of the lateral tabs and the first end tab. Additionally, or alternatively, a mitered notch can be formed between each of the lateral tabs and the second end tab.

The first end tab can be wider than the second end tab. Optionally, the central sheet is wider than the second end tab. Additionally, or alternatively, the central sheet can be longer than the lateral tabs.

It is another aspect of the present disclosure to provide an apparatus for clarifying liquid in which solids are suspended. The apparatus comprises: (1) a frame; and (2) a plurality of settler plates spaced along a longitudinal axis of the frame to define a plurality of channels, each of the settler plates including: (a) a settling surface; (b) a back surface; (c) a baffle at a lateral side of the settling surface, the baffle extending upwardly above the settling surface; (d) a stiffening feature at a lower end; and (e) a hollow support proximate to an upper end that is integrally formed with the settling surface, the hollow support extending upwardly above the settling surface and including a hollow interior and an orifice for liquid flowing upwardly from a channel to enter into the hollow interior, the hollow interior to direct liquid laterally to a trough.

In one embodiment the hollow support further comprises a first segment extending from the settling surface.

In one embodiment the hollow support further comprises a second segment extending from the first segment.

In one embodiment the hollow support further comprises a third segment extending from the second segment toward the baffle.

Optionally, the third segment is oriented at an oblique angle to the second segment. In one embodiment the hollow support further comprises a fourth segment extending from the third segment and proximate to an end of the baffle.

The fourth segment is optionally oriented at an oblique angle to the third segment.

In one embodiment the hollow support further comprises a fifth segment extending from the fourth segment, the fifth segment extending along a portion of the first segment.

Optionally, two of the segments are oriented approximately perpendicular to each other.

In one embodiment, the second segment is approximately perpendicular to the first segment.

Additionally, or alternatively, the fourth segment is optionally oriented approximately perpendicular to one or more of the first segment and the fifth segment.

In one embodiment, the fourth segment is approximately parallel to the second segment.

In one embodiment, the fifth segment is approximately parallel to the first segment.

Optionally, the hollow support includes a fastener extending through two of the segments.

In one embodiment, the fastener extends through the first and fifth segments.

Optionally, the orifice extends through an uppermost portion of the hollow support.

In one embodiment, the uppermost portion of the hollow support is oriented approximately horizontally when the settler plate is positioned in the frame.

In one embodiment, the orifice extends through the second segment.

In one embodiment, an interior angle between the settling surface and the first segment is between approximately 130° and approximately 160°.

In one embodiment, the hollow support does not intersect a plane defined by the back surface.

In one embodiment, the settler plate and the hollow support are formed from a single piece of a stainless steel alloy In one embodiment, the settler plate and the hollow support are formed without welding.

In one embodiment, the baffle includes a flange that extends above the settling surface In one embodiment, a flange of a first settler plate contacts a back surface of a second adjacent settler plate.

In one embodiment, the baffle includes a port formed proximate to a lower end of the baffle.

In one embodiment, the port has a shape that is generally circular, rectangular, or square.

In one embodiment, the settler plates are inclined at an angle of between approximately 50° and approximately 60° relative to the longitudinal axis of the frame.

It is another aspect of the present disclosure to provide a settler plate, comprising: (1) a settling surface that is substantially rectangular; (2) a back surface opposite to the settling surface; (3) a baffle at a lateral side of the settler plate; (4) a stiffening feature at a lower end of the settler plate; and (5) a hollow support at an upper end of the settler plate, the hollow support extending from the settling surface and including: (a) a hollow interior to transport liquid laterally; (b) a width that is greater than a width of the settling surface; and (c) an orifice for liquid to enter the hollow support.

In one embodiment, the hollow support is integrally formed with the settler plate.

In one embodiment, the settler plate is formed from a single piece of a stainless steel alloy.

In one embodiment, the settle plate is formed without welding.

In one embodiment, the baffle extends upwardly above the settling surface.

In one embodiment, the baffle includes a port formed proximate to a lower end of the baffle.

In one embodiment, the port has a shape that is generally circular, rectangular, or square.

In one embodiment, the baffle includes a flange that extends above the settling surface In one embodiment, the flange is configured to contact a back surface of a second adjacent settler plate.

Optionally, the orifice extends through an uppermost portion of the hollow support when the settler plate is in a position of use.

In one embodiment, the uppermost portion of the hollow support is oriented approximately horizontally when the settler plate is in the position of use.

In one embodiment, the hollow support is formed by bending a piece of the settler plate at least four times.

In one embodiment, the hollow support comprises a first segment extending from the settling surface.

In another embodiment, the first segment is the uppermost portion of the hollow support when the settler plate is in the position of use.

In one embodiment, an interior angle between the settling surface and the first segment is between approximately 130° and approximately 160°.

In one embodiment, the hollow support further comprises a second segment extending from the first segment.

In one embodiment, the second segment is oriented approximately perpendicular to the first segment.

In one embodiment, the orifice is formed through the second segment.

In one embodiment, a third segment extends from the second segment toward the baffle.

The third segment is optionally oriented at an oblique angle relative to the second segment.

In one embodiment, an interior angle between the second segment and the third segment is between approximately 115° and approximately 121°.

In one embodiment, a fourth segment extends from the third segment and proximate to an end of the baffle.

In one embodiment, the fourth segment is oriented approximately parallel to the second segment.

The fourth segment is optionally oriented at an oblique angle relative to the third segment.

In one embodiment, an interior angle between the third segment and the fourth segment is between approximately 59° and approximately 65°.

In one embodiment, a fifth segment extends from the fourth segment.

In one embodiment, the fourth segment is approximately perpendicular to one or more of the first segment and the fifth segment.

Optionally, the hollow support includes a fastener extending through two of the segments.

In one embodiment, the fifth segment is joined to the first segment by a fastener.

Still another aspect is to provide a method of forming a settler plate, comprising: (1) providing a blank of a metallic material, the blank including a first end tab, a second end tab, and lateral tabs; (2) bending the first end tab at least two times to form a hollow support that extends from a settling surface of the settler plate; (3) bending the second end tab at least two times to form a stiffening feature at a lower end of the settler plate; and (4) bending the lateral tabs upwardly to form a baffle at each lateral side of the settler plate, the baffles extending above the settling surface.

In one embodiment, the blank is a stainless steel alloy.

The method may include bending the first end tab upwardly approximately 35° to form a first segment of the hollow support, the first segment extending from the settling surface.

The method may include bending the first end tab upwardly approximately 90° to form a second segment of the hollow support that extends from the first segment.

The method may include bending the first end tab upwardly between approximately 59° and approximately 65° to form a third segment of the hollow support that extends from the second segment.

The method may include bending the first end tab upwardly between approximately 115° and approximately 121° to form a fourth segment of the hollow support that extends from the third segment.

The method may include bending the first end tab upwardly approximately 90° to form a fifth segment of the hollow support that extends from the fourth segment.

In one embodiment, the fifth segment is approximately parallel to the first segment.

The method may include joining the fifth segment to the first segment with a fastener.

The method may include bending the first end tab upwardly to form a sixth segment of the hollow support that extends from the fifth segment, the sixth segment defining a free end of the first end tab.

The method may include bending the lateral tabs to form a flange at a distal end of each of the baffles.

In one embodiment, the flanges extend approximately parallel to the settling surface.

Optionally, the method includes joining two of the segments with a fastener.

In one embodiment, the fastener extends through the first segment and the fifth segment.

The method may further include forming an orifice through the first end tab.

In one embodiment, after bending the first end tab to form the hollow support, the orifice extends through the second segment.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become clearer from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about" or "approximately." Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range, or to any value within the range without deviating from the invention.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s). The drawings are not necessarily to scale. In certain instances, details that are not necessary for an understanding of the disclosure or that render other details difficult to perceive may have been omitted.

FIG. 4A is a side perspective view of a settler plate of an embodiment of the present disclosure;

FIG. 4B is a back perspective view of the settler plate of FIG. 4A;

FIG. 4C is a side elevation view of the settler plate of FIG. 4A;

FIG. 4D is an end elevation view of the settler plate of FIG. 4A with some features of the settler plate shown in hidden lines;

FIG. 4H is another partial side elevation view of upper portions of settler plates of the present disclosure positioned in the clarifier;

FIG. 15A is a side perspective view of a settler plate of another embodiment of the present disclosure;

FIG. 15B is a top plan view of the settler plate of FIG. 15A;

FIG. 15C is a side elevation view of the settler plate of FIG. 15A;

FIG. 15D is an end elevation view of the settler plate of FIG. 15A with some features of the settler plate shown in hidden lines;

Figure 1:
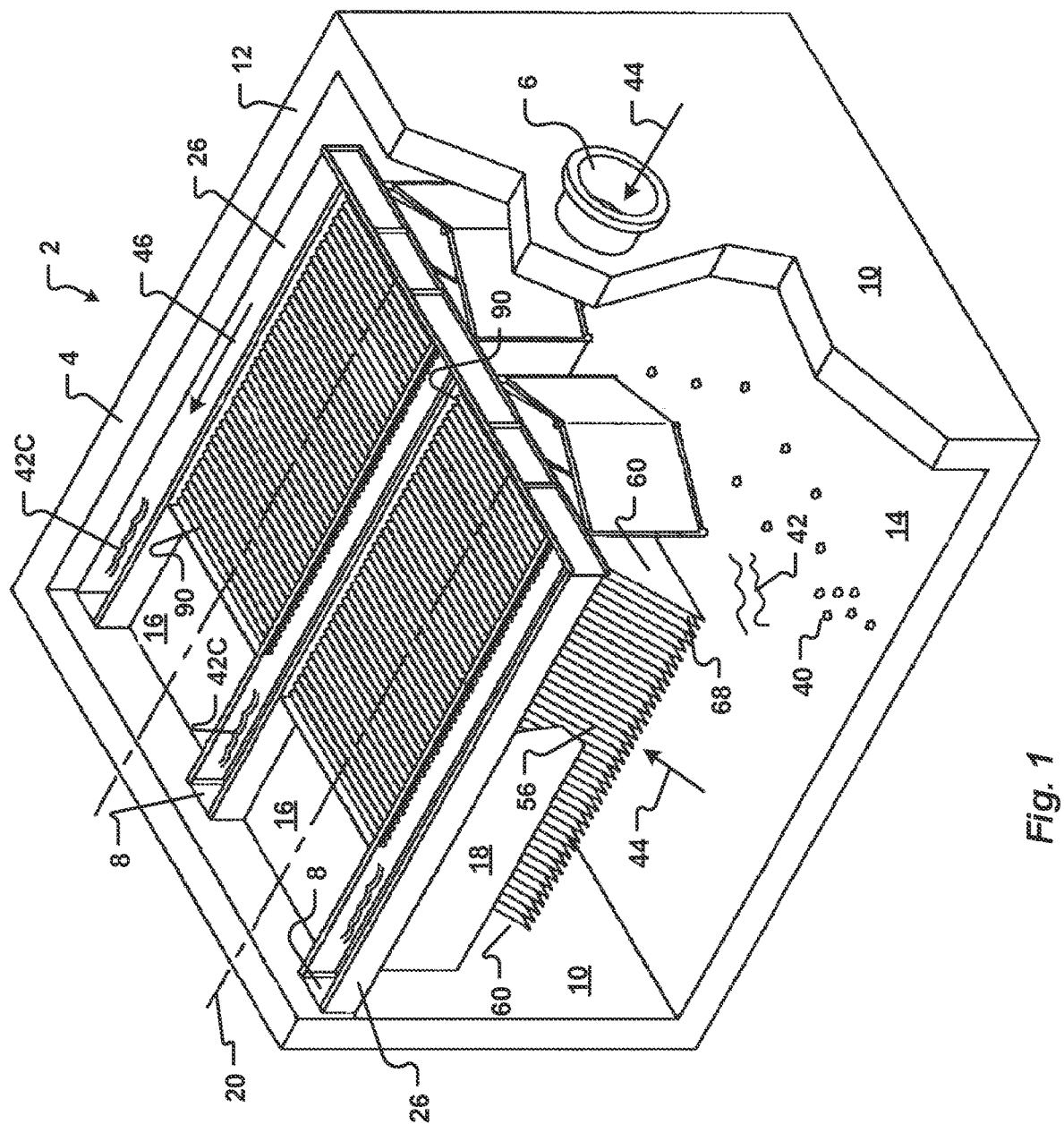
FIG. 1 is a schematic view of a clarifier of one embodiment of the present disclosure.

It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
|---|---|
| 2 | Clarifier |
| 4 | Detention basin |
| 6 | Inlet to basin |
| 8 | Outlet from basin |
| 10 | Walls of basin |
| 12 | Open top of basin |
| 14 | Bottom of basin |
| 16 | Sections of the basin |
| 18 | Partition |
| 20 | Longitudinal axis |
| 26 | Trough |
| 30 | Weir |
| 32 | Trough inlet |
| 34 | Baffle or upper mounting plate |
| 36 | Recess of baffle |
| 40 | Solids |
| 42 | Liquid |
| 42C | Clarified liquid |
| 44 | Arrow indicating flow of liquid and solids |
| 46 | Arrow indicating flow of clarified liquid |
| 47 | Arrow indicating movement of solids |
| 48 | Liquid level |
| 50 | Plate pack |
| 51 | Frame of plate pack |
| 52 | Cover of plate pack |
| 54 | Stud |
| 56 | Channel defining a quiescent zone |
| 58 | Outlet of a channel |
| 60 | Settler plate |
| 62 | Settling surface |
| 64 | Width of settling surface |
| 66 | Upper end of settler surface |
| 68 | Lower end of settler surface |
| 70 | Stiffening feature of settler plate |
| 71 | Flange of stiffening feature |
| 72 | Lateral side of the settler surface |
| 74 | Baffle of the settler plate |
| 76 | Distal portion of baffle |
| 78 | Flange of the baffle |
| 80 | End of baffle |
| 82 | Port for effluent |
| 83 | Distance between port and settling surface |
| 84 | Back surface |
| 86 | Rivet or mechanical fastener |
| 90 | Hollow support |
| 92 | Hollow interior |
| 94 | Width of hollow support |
| 95 | Distance between hollow supports |
| 96A | First or upper segment |
| 96B | Second segment |
| 96C | Third segment or lower segment |
| 96D | Fourth segment |
| 96E | Fifth segment |
| 96F | Sixth segment |
| 98 | Orifice or aperture into a hollow support |
| 99 | Free end |
| 110 | Blank |
| 112 | Central sheet |
| 114 | First end tab |
| 116 | First bend axis |
| 118 | Second bend axis |
| 120 | Third bend axis |
| 122 | Fourth bend axis |
| 124 | Fifth bend axis |
| 126 | Second end tab |
| 128 | Sixth bend axis |
| 130 | Seventh bend axis |
| 132 | Lateral tabs |
| 134 | Eighth bend axis |
| 136 | Ninth bend axis |
| 138 | Notch |
| 140 | Notch |
| 142 | Projection |
| 144 | Rivet position |
| 146 | Tenth bend axis |
| 148 | Eleventh bend axis |
| R1 | Radius between settling surface and first segment |
| R2 | Radius between first segment and second segment |
| R3 | Radius between second segment and third segment |
| Ω | Angle between longitudinal axis and settler plate |

DETAILED DESCRIPTION

Referring to FIG. 1, a clarifier 2 of one embodiment of the present disclosure is shown for removing materials and waste such as solids 40 from liquid 42. The clarifier 2 can include outer walls 10 which define a detention basin 4 having an open top 12 and a bottom 14. One embodiment of the clarifier 2 is shown in FIG. 1 and has a generally rectangular shape. However, clarifiers 2 of the present disclosure can have other shapes, such as square or circular. The basin 4 can be divided into a number of sections 16. The sections 16 can be defined by an outer wall 10 and, optionally, by an internal partition 18. A portion of the internal partition is illustrated. The clarifier sections 16 can function to contain the liquid 42 and the solids 40 within a predetermined portion of the clarifier.

A plurality of settler plates 60 are positioned in the clarifier 2 in a spaced relationship to each other for defining separate channels 56 in which the liquid 42 flows upwardly (as indicated by arrow 44) to settle the solids 40 and provide a clarified liquid 42C. The settler plates 60 can be spaced along a longitudinal axis 20 of a partition 18. A hollow support 90 is associated with each of the settler plates. A trough 26 for clarified liquid 42C can be provided at one or both lateral sides of each settler plate 60. The hollow supports 90 can be releasably fixed to the troughs 26. In this manner, the plurality of settler plates 60 can be releasably positioned in the clarifier.

As the liquid 42 and the solids 40 flow through the basin 4 from an inlet 6 to outlets 8, the flow of the liquid 42 and the solids 40 is substantially reduced according to the principles of the present disclosure to form many very low flow rate, or quiescent, zones defined by flow channels 56 between adjacent settler plates 60 in the clarifier 2. The liquid 42 and the solids 40 flow upwardly (see arrows 44 indicating the flow of liquid and solids) in the channels 56 so that the solids 40 settle out of the liquid 42 and the resulting clarified liquid 42C (represented by arrows 46), flows into hollow supports 90 associated with the settler plates 60. The clarified liquid 42C flows through the hollow supports 90 to the outlets 8 of the clarifier 2. These outlets 8 may be in the form of openings from the troughs 26.

Figure 2:
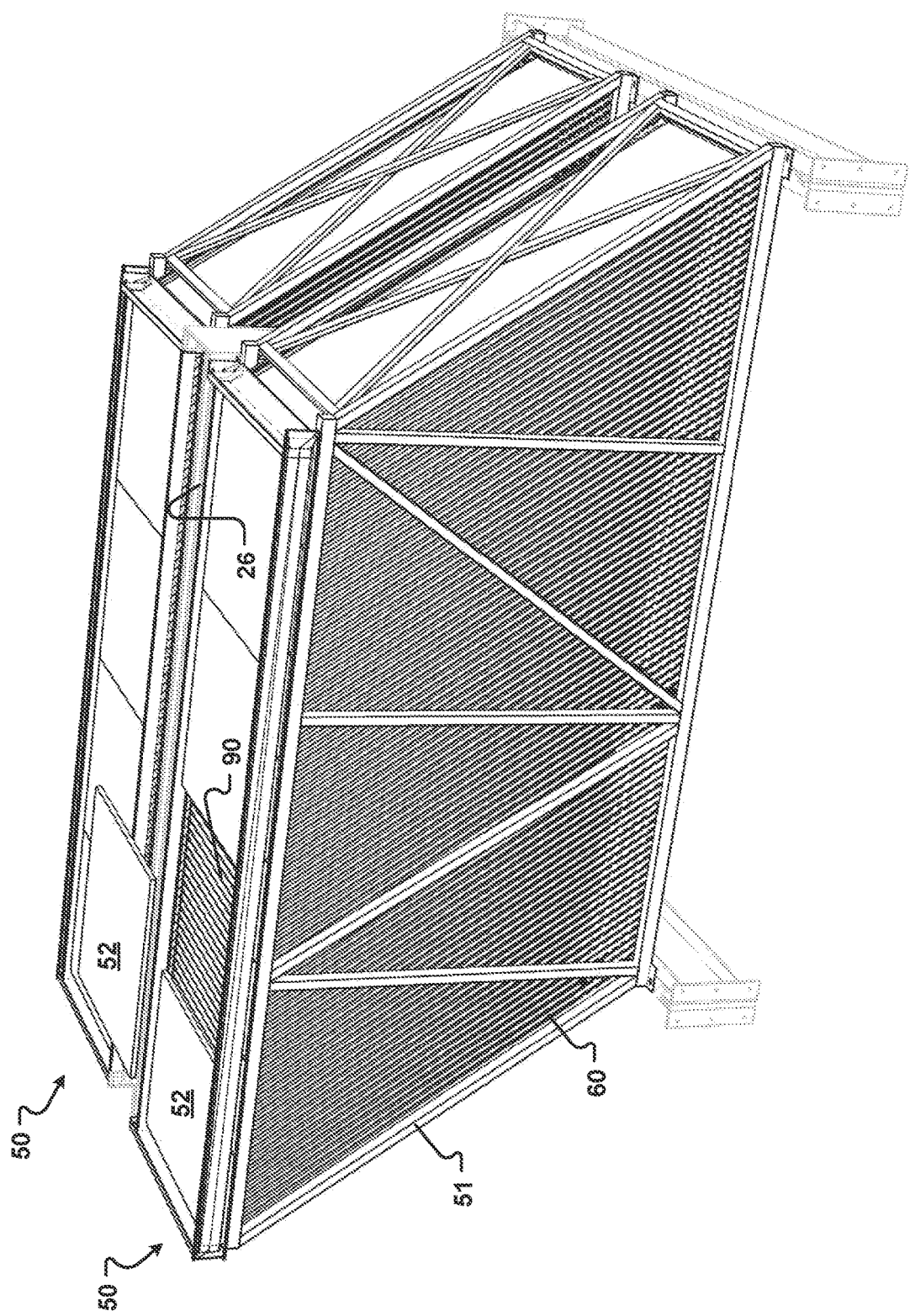
FIG. 2 is a side perspective view of a plate pack including settler plates of one embodiment of the present disclosure.

Referring now to FIG. 2, a plate pack 50 of the present disclosure is generally illustrated. The plate pack 50 comprises a plurality of settler plates 60 supported by a frame 51. In one embodiment, the plate pack 50 includes from approximately eight settler plates 60 to approximately one hundred twenty settler plates. Optionally, a cover 52 can be included with the plate pack 50. The plate pack 50 can be installed in a basin 4 with, or in place of, a clarifier section 16 such as described in conjunction with FIG. 1.

Figure 3B:
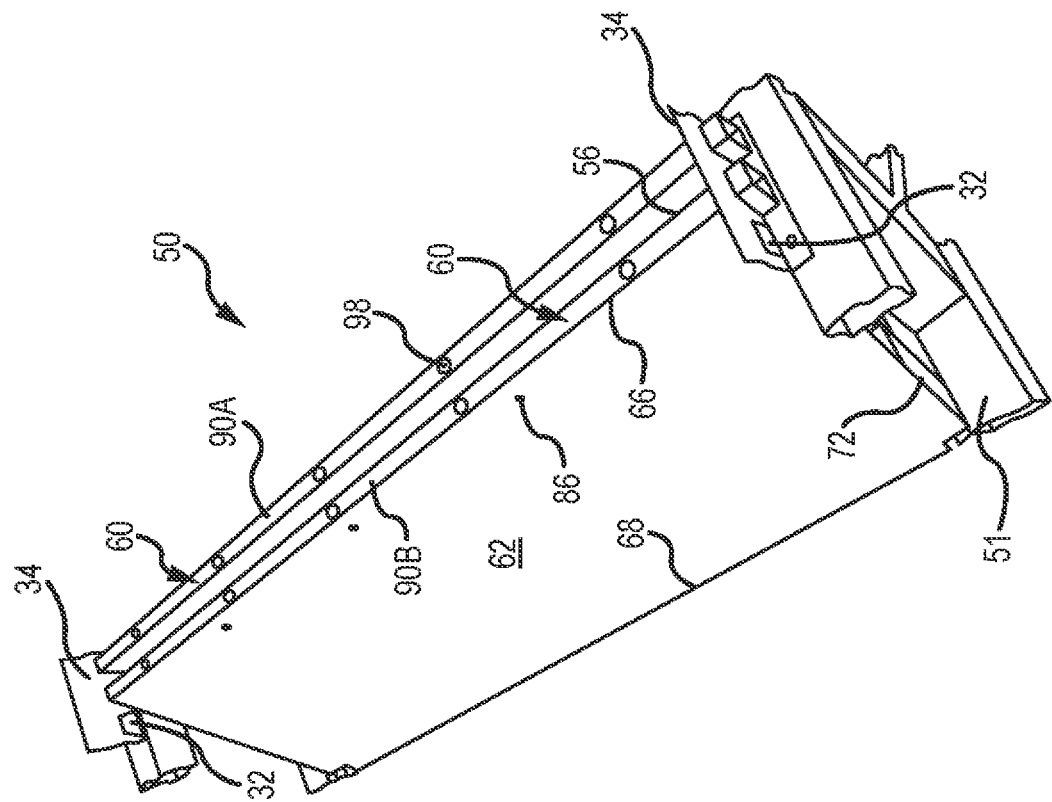
FIGS. 3A, 3B are partial views of a frame holding settler plates of the present disclosure.
Figure 3A:
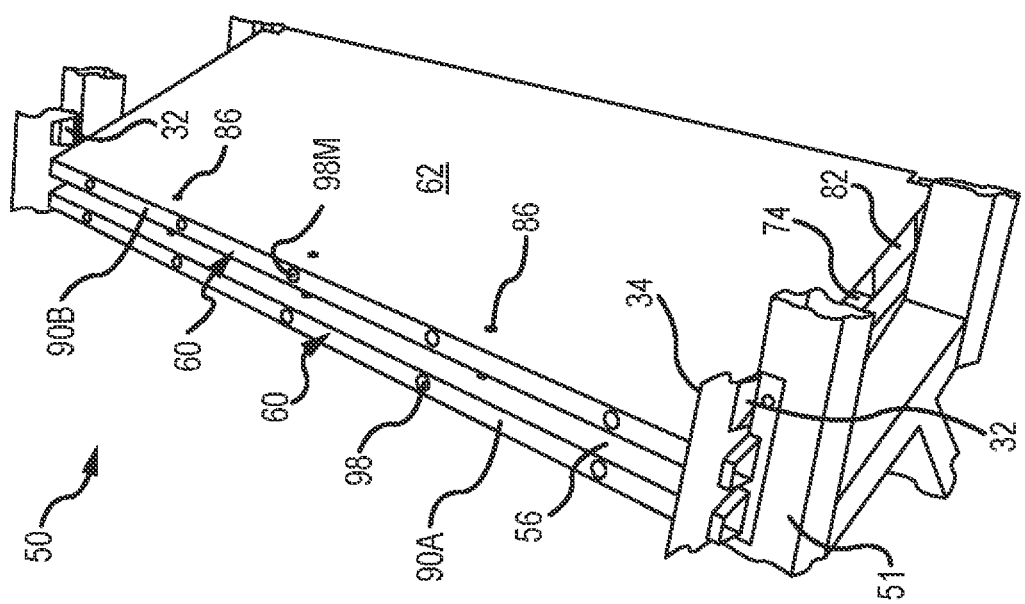

Referring now to FIGS. 3A, 3B, a portion of a plate pack 50 and two settler plates 60 of an embodiment of the present disclosure are generally illustrated. The settler plates 60 are illustrated having a width between two lateral sides 72 that is greater than a length defined between an upper end 66 and a lower end 68 of the settling surface 62. In other embodiments, the width of the settler plate 60 is less than the length.

Each settler plate 60 is associated with a hollow support 90. The hollow supports 90 are configured to carry one settler plate 60 in the frame 51. The hollow support can be fastened or affixed to the settler plate. More specifically, the hollow support can be affixed to the settler plate by a weld, a rivet, a bolt, a screw, a mechanical interlocking attachment, an adhesive, and other known attachment means. In one embodiment, a mechanical fastener 86 can extend through a portion of the settler plate, such as the settling surface 62, into the hollow support 90. Additionally, or alternatively, in one embodiment a hollow support 90 can be integrally formed at an upper end 66 of a settler plate 60.

Adjacent hollow supports 90A, 90B carry respective adjacent settler plates 60 in a predetermined alignment to define one channel 56. Opposite ends of each hollow support 90 are engaged with a trough (such as illustrated in FIG. 1). This engagement can be removable as described below. Alternatively, the hollow supports 90 can be fixed to the plate pack 50. Specifically, the hollow support 90 can be joined to a portion of the frame 51, such as a support element or baffle 34, by a fastener, a mechanical interlocking attachment, a weld, or other means.

Referring now to FIGS. 4A-4H, settler plates 60 of embodiments of the present disclosure are generally illustrated. A settler plate 60 includes a settling surface 62 with an upper end 66, a lower end 68, and lateral sides 72. The settling surface 62 can have a shape that is generally rectangular and substantially planar. In one embodiment, the settling surface 62 has a length of between approximately 100 inches and approximately 130 inches. Optionally, the settling surface has a width 64 of between approximately 44 inches and approximately 64 inches. The settling surface 62 is generally smooth to facilitate movement of solids 40 that collect on the settling surface 62 toward the lower end 68. Optionally, a coating can be added to the settling surface 62 to prevent, or reduce the likelihood, of solids sticking. In one embodiment, the coating can be a polytetrafluoroethylene (PTFE) (such as Teflon), a silicone, an enamel, or a ceramic.

The settler plate 60 can be made of any suitable material, such as one or more of stainless steel, fiber reinforced composites, plastic, polyvinyl chloride (PVC), carbon steel, and aluminum. In one embodiment, the settler plate 60 comprises a 304 stainless steel alloy. The material from which the settler plate 60 is formed can have a thickness of between approximately 0.015 inches and 0.035 inches. Optionally, the settler plate 60 is formed of a 20 to 26 gauge material. In one embodiment, the settle plate is manufactured from a 24 gauge stainless steel alloy.

Figure 4E:
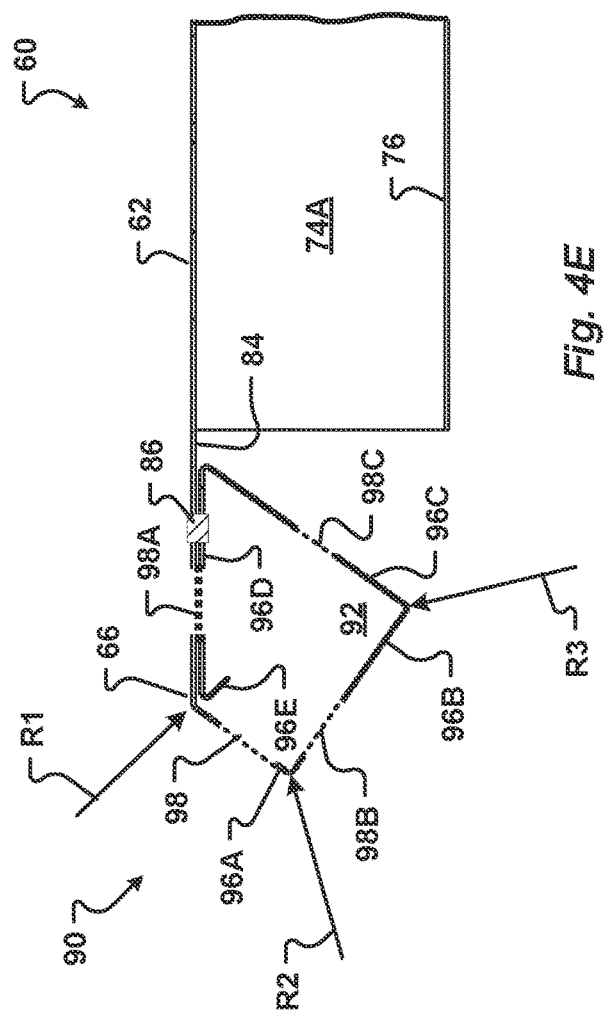
FIG. 4E is an expanded side elevation view of a portion the settler plate illustrating a hollow support of one embodiment of the present disclosure.

A hollow support 90 extends from the settler plate 60 proximate to the upper end 66. The hollow support 90 includes a hollow interior 92. In one embodiment, the hollow support 90 projects or extends away from the settling surface 62. For example, the hollow interior 92 can be positioned to extend from a back surface 84 of the settler plate. More specifically, the hollow support 90 can be formed such that a plane contacting the settling surface 62 is not interrupted by the hollow support. Said differently, the hollow support can be oriented such that no portion of the hollow support 90 contacts the plane contacting the settling surface. In one embodiment, the hollow support 90 is formed such that liquid 42 can flow upward generally parallel to the settling surface to the upper end 66 without obstruction or interference from the hollow support 90. This configuration, which is generally illustrated in FIG. 4E, can improve the flow of liquid 42 along the settling surface 62. More specifically, liquid 42 flowing upward proximate to the settling surface 62 can flow up to and beyond the upper end 66 of the settling surface without altering direction to flow around the hollow support. Accordingly, turbulence in the liquid 42 may beneficially be reduced and efficiency of the settler plate 60 may be improved. For example, liquid 42 flowing upwardly proximate to the settling surface 62 can be substantially laminar. In contrast, in some prior art settlers such as described in U.S. Pat. No. 7,850,860, an angled support is interconnected to, and extends above a settling surface of an associated settling plate. Liquid flowing upwardly in a channel of the '860 patent must flow around a leg of the support which extends from the settling surface of the settling plate. This arrangement may disrupt the upward flow of liquid and could cause turbulence or eddies in the channel and can decrease the efficiency of the settler describe in the '860 patent.

A width 94 of the hollow support can be greater than the width 64 of the settling surface. For example, the width 94 of the hollow support 90 can be between approximately 46 inches and approximately 66 inches. Accordingly, at least a portion of the hollow support 90 can extend beyond one or both baffles 74 positioned at the lateral sides 72 of the settling surface 62 as generally illustrated in FIG. 4D. In one embodiment, the width 94 of the hollow support 90 is at least approximately 3% greater than the width 64 of the settling surface.

In one embodiment, the hollow support 90 is integrally formed with the settling surface 62. For example, the hollow support 90 can be formed by altering the shape of a tab 114 extending from the upper end 66 as generally described in conjunction with FIGS. 9-10. The hollow support 90 is illustrated in FIG. 4E with four sides including a portion of the settling surface 62. Optionally, the hollow support 90 can have a cross-section of a trapezoid. However, the hollow support 90 can have other configurations with more, or fewer sides. In one embodiment, the tab can be bent or rolled such that the hollow support 90 has a cross-section that is generally circular. In another embodiment, the tab extending from the upper end 66 can be bent to form a hollow support with a triangular or rectangular cross-section. In one embodiment, the hollow support 90 has a cross-sectional shape of a regular or irregular polygon.

Referring now to FIG. 4E, in one embodiment the hollow support includes a number of segments 96 formed by bending or folding the tab extending from the settling surface 62. For example, the hollow support 90 can comprise a first segment 96A interconnected to the settling surface 62. A second segment 96B can extend from the first segment. A third segment 96C of the hollow support can extend from the second segment 96B. A fourth segment 96D can optionally run from the third segment 96C and be oriented substantially parallel to a back surface 84 of the settling surface 62. The fourth segment 96 can contact the back surface 84 in one embodiment of the present disclosure. Additionally, or alternatively, a fifth segment 96E can extend inwardly from an end of the fourth segment 96D. The fifth segment 96E is configured to increase the stiffness of one or more of the fourth segment 96D and of the hollow support 90. For example, the fifth segment 96E can increase the stiffness of the hollow support 90 such that the settling surface 62 and the fourth segment 96D do not bend or deform if a mechanical fastener 86 is added to the hollow support. Accordingly, in one embodiment, because of the fifth segment 96E, the hollow support 90 can be formed of less (or thinner) material without decreasing the strength of the hollow support, beneficially reducing the material expense of the settler plate 60.

The first segment 96A can be oriented at an angle with respect to the settling surface 62 such that when the settler plate 60 is positioned in a clarifier 2, the first segment 96A will be substantially horizontal as generally illustrated in FIG. 4H. Similarly, the third segment 96C can be formed such that it is substantially horizontal when the settler plate 60 is positioned in the clarifier 2. More specifically, as generally illustrated in FIG. 4H, an angle between an exterior surface of the third segment 96C and the back surface 84 of the settling surface can be greater than 90°. In this manner, clarified liquid 42C can be directed to a channel outlet 58 and does not have to flow downward to flow around the hollow support 90.

In one embodiment, the first segment 96A is oriented at an angle of between approximately 120° and 130°, or approximately 125° with respect to the settling surface 62. Optionally, the first segment 96A and the second segment 96B are approximately perpendicular. Additionally, or alternatively, the second and third segments 96B, 96C can be approximately perpendicular. In one embodiment, the first segment 96A and the third segment 96C are approximately parallel. The fourth segment 96D can be oriented at an angle of between approximately 50° and 60°, or approximately 55° with respect to the third segment 96C. The fifth segment 96E may be bent inwardly at an angle of between approximately 40° and 50°, or approximately 45°, relative to the fourth segment 96D.

In one embodiment, the first segment 96A is interconnected to the settling surface 62 by a first radius of curvature R1. Optionally, the first radius of curvature R1 can be between approximately 1/16 inches and 5/16 inches, or approximately 3/16 inches. A second radius of curvature R2 can be formed between the first segment 96A and the second segment 96B. The second radius of curvature R2 can be between approximately 1/8 inches and 5/8 inches, or approximately 3/8 inches. Further, an optional third radius of curvature R3 can be formed between the second segment 96B and the third segment 96C. In one embodiment, the third radius of curvature R3 is between approximately 1/32 inches and 5/32 inches, or approximately 1/16 inches.

The first segment 96A can have a length of between approximately 0.80 inches and 1.10 inches. The second segment 96B is generally longer than the first segment. In one embodiment, the second segment 96B has a length of between approximately 1.30 inches and 1.70 inches. The third segment 96C can have a length of between approximately 1.70 inches and approximately 2.10 inches. Optionally, the fourth segment 96D has a length of from approximately 1.60 inches to 2.00 inches. Finally, the optional fifth segment 96E may have a length of from approximately 0.10 to 0.35 inches.

At least one of the first segment 96A, the second segment 96B, the third segment 96C, the fourth segment 96D, and the fifth segment 96E can be generally planar. Additionally, or alternatively, one or more of the segments can have a shape that is not planar. For example, in one embodiment, at least one of the segments 96A—96E is curved or arched.

Optionally, at least one of the segments 96 of the hollow support 90 can be affixed or fastened to the settling surface. For example, in one embodiment, the fourth segment 96D is affixed to the settling surface 62 with a mechanical fastener 86. The mechanical fastener can be a rivet 86 or the like. Alternatively, the mechanical fastener 86 can be a screw or bolt. Additionally, or alternatively, the fourth segment 96D can be joined to the back surface 84 by any suitable means. In one embodiment, the fourth segment can be joined to the back surface 84 with one or more of an adhesive, a glue, a weld, or a solder. In one embodiment, a projection 142 (illustrated in FIG. 9) extending from a lateral side 72 of the settling surface 62 can be bent around the fourth segment 96D after the hollow support 90 is formed to pinch or draw the fourth segment against the back surface 84. In another embodiment, no mechanical fasteners penetrate the segments 96 of the hollow support 90. Accordingly, fewer operations are performed when forming the hollow support 90 which decreases the cost of the settler plate 60.

An orifice 98 is formed through the hollow support 90 to direct clarified liquid into the hollow interior 92. The hollow support 90 can include any number of orifices 98. The size and number of orifices can be selected to restrict the flow of clarified liquid 42C into the hollow support 90 to a predetermined rate according to the anticipated range of flow rates of the liquid 42 and the solids 40 into the basin 4. In this manner, the desired flow rate of clarified liquid 42C through the orifices 98 is obtained. For example, flow rates of from about 1 GPM to about 2 GPM into a hollow support through the orifices 98 of a plate settler 60 can be achieved.

In one embodiment, from four to eight orifices 98 are formed in the hollow support 90. The orifices 98 can be substantially evenly spaced across the width 64 of the settling surface 62. By spacing the orifices 98 across the settling surface width 64, the flow of liquid 42 can be metered across the width of the settler plate 60 to facilitate even flow of the liquid as it rises up along the settling surface 62. In one embodiment, at least one orifice 98M can be formed in a median portion of the width 64 of the hollow support as generally illustrated in FIGS. 3A and 4D. Clarified liquid 42C flowing upward in a median portion of a channel 56 can then enter the hollow support 90 through the median orifice 98M before flowing laterally toward one of the lateral sides 72 of the settler plate 60. This can beneficially prevent a restriction in the upward flow of the liquid 42 in the channel 56 and thus can promote a substantially uniform upward flow rate of the liquid across the width 64 of the settler plate. Said differently, the clarified liquid 42C can be evenly drawn into the hollow support 90 through orifices 98 across the width 64 of the settling surface 62. In one embodiment, the liquid 42 can flow less than approximately 7 inches laterally (or less than about ⅛th of the width 64) to reach an orifice 98 to flow into the hollow support 90.

In contrast, in some prior art settler plates, when a clarified liquid reaches an upper end of a channel, the liquid must flow laterally to an edge of the settler plate before more of the clarified liquid can flow to the channel upper end. More specifically, the clarified liquid might have to flow at least one-half of the width of the settler plate to reach a trough or weir of a prior art settler. The clarified liquid is drawn off from the lateral edges of the settler plate. Liquid may pool or build up in the middle width of the channel, and the upward flow of liquid in the middle of the channel may stagnate. This may cause a restriction in the upward flow of the liquid in some prior art settler plates and create areas of decreased liquid flow, for example, in a middle third of the settler plate.

The orifices 98 can be of any shape and dimension. In one embodiment, the orifices can be generally circular, oval, square, or elongated slots. Optionally, each orifice 98 has a width or diameter of between approximately 0.6 inches to approximately 0.8 inches. In one embodiment, the orifices 98 have a total surface area or cross-sectional area of between approximately 1.2 square inches to approximately 2.7 square inches. The orifices can be formed by punching or drilling through the hollow support.

The orifice 98 can be formed through the first segment 96A of the hollow support. Optionally, the orifice 98A can be formed through the optional fourth segment 96D and the settling surface 62 of the settler plate 60. In one embodiment, the orifice 98B is formed through the second segment 96B of the hollow support 90 and will generally face an adjacent settler plate when the settler plate 60 is positioned in a clarifier 2. Additionally, or alternatively, an orifice 98C can be formed through the third segment 96C of the hollow support.

In one embodiment, one or more of the orifices 98 can include a closure configured to selectively seal the orifice. In this manner, an operator can open or close one or more of the orifices 98 to adjust the flow of clarified liquid 42C into a hollow support 90. The closure can be slidably associated with the settler plate 60. Additionally, or alternatively, the closure can be snapped or frictionally retained on the settler plate. Optionally, the closure may comprise a plug that can be selectively positioned within an orifice 98.

The settler plate 60 can include a flange or baffle 74 that extends from one or both of the lateral sides 72 of the settling surface 62. In one embodiment, the baffle 74 is integrally formed with the settling surface. For example, the baffle can be formed by bending a tab 132 that extends from a lateral side of the settling surface 62 (as generally described in conjunction with FIG. 9). The baffle 74 can be approximately perpendicular to the settling surface. Optionally, the baffle 74 extends away from the settling surface 62. In one embodiment, the baffle has a height of between approximately 0.5 inches and approximately 2.0 inches.

Figure 4F:
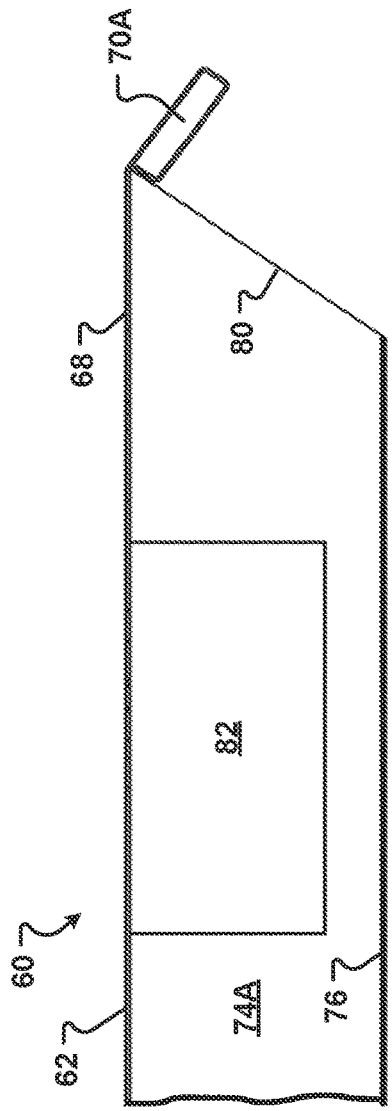
FIG. 4F is another expanded side elevation view of a portion the settler plate illustrating a stiffening feature of one embodiment of the present disclosure.
Figure 4G:
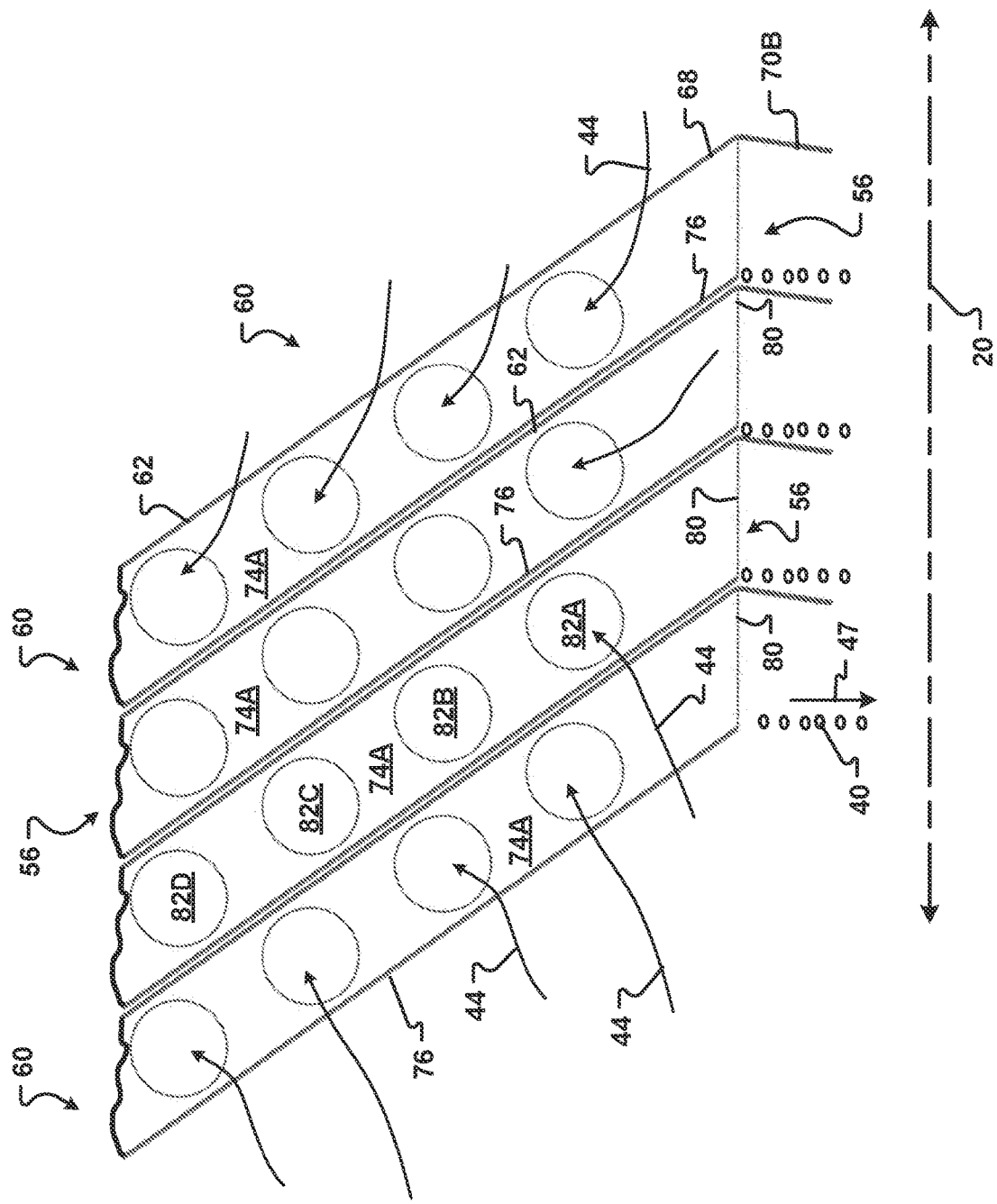
FIG. 4G is a partial side elevation view of lower portions of settler plates of the present disclosure positioned in a clarifier.

A distal portion 76 of the baffle 74 is configured to contact a settling surface 62 of an adjacent settler plate as generally illustrated in FIGS. 4G-4H. In this manner, the height of the baffle 74 can define a height of a channel 56 between the adjacent settler plates 60.

A flange 78 can extend from the distal portion 76 of the baffle. The flange 78 (best seen in FIG. 4D) can be formed by folding or bending the baffle distal portion 76. In one embodiment, the flange 78 is substantially parallel to the settling surface 62. The flange 78A of a first baffle 74A can extend toward the flange 78B of a second baffle 74B. Accordingly, the flange 78 can extend under the settling surface 62 of the settler plate 60. Optionally, the flange 78 has a width of between approximately 0.3 inches and approximately 1.8 inches.

The flange 78 is configured to contact a settling surface 62 of an adjacent settler plate 60. In one embodiment, the flange 78 is adapted to increase the strength or rigidity of the settler plate 60. Additionally, or alternatively, the flange 78 can distribute the force applied by a settler plate 60 to the settling surface of an adjacent settler plate. Accordingly, the flange 78 can reduce damage or unintended bending to the adjacent settler plate. The flange 78 can also help form a seal between adjacent settler plates 60. In this manner, liquid 42 may be prevented from unintentionally entering a channel 56 between adjacent settler plates between a baffle 74 and a settling surface. Accordingly, the baffle 74 can be used in the clarifier to replace one or more of the partitions 18. The flange 78 can thus improve the efficiency of a settling plate 60.

Optionally, an interior angle between the flange 78 and the baffle 74 can be at least 90°. For example, the interior angle can be between approximately 91° and approximately 95°. In this manner, when the flange is positioned against a settling surface 62 of an adjacent settler plate 60, the flange 78 can create a biasing force and form the seal with the adjacent settling surface.

An end 80 of the baffle 74 proximate to the lower end 68 of the settling surface 62 can optionally be oriented at an angle with respect to the settling surface 62 as generally shown in FIG. 4F. The angle can be selected such that when the settler plate 60 is positioned in a basin 4 of a clarifier 2, the baffle end 80 will be substantially horizontal, as generally illustrated in FIG. 4G. Optionally, the baffle end 80 is approximately parallel to a plane defined by the first segment 96A of the hollow support 90. The end 80 can be oriented at an angle of between approximately 50° and 60°, or approximately 55° with respect to a back surface 84 of the settler plate 60.

A port 82 can be formed through the baffle 74. The port has a size and geometry selected to admit liquid 42 with solids 40 into a channel 56 between adjacent settler plates 60 at a predetermined rate. The port 82 is generally positioned closer to the lower end 68 than to the upper end 66 of the settling surface 62. For example, a port 82 can be positioned at least approximately 1 inch from the lower end. In one embodiment, each baffle 74 has two or more ports 82.

The port 82 can have a generally rectangular shape such as illustrated in FIGS. 4C, 4F. Optionally, one or more corners of the port 82 can be rounded or curved. Additionally, or alternatively, at least one port 82 can be oval. In one embodiment, the settler plate 60 can include a port 82 that has a round shape as generally illustrated in FIG. 4G. In one embodiment, each baffle 74 can include up to six ports 82. The port 82 can have a width or diameter of between approximately 0.25 inches and approximately 1.5 inch. In another embodiment, the port can have a length of from approximately 1 inch to 9 inches.

The ports 82 can have different sizes. For example, in one embodiment a first port 82A proximate to the baffle end 80 has a larger size than a second port 82B positioned further from the baffle end 80. Each successive port 82 can decrease in size as the distance from the baffle end 80 increases. Forming a plurality of ports 82 with graduated sizes can enhance the flow characteristics of liquid 42 entering a channel 56. For example, the graduated ports 82 can reduce turbulence (or eddy currents, changes in flow direction or velocity) in the flow of liquid 42 within the channel 56 improving the rate at which solids 40 settle out of the liquid 42 and thereby increasing the efficiency of the clarifier 2.

The port 82 can be formed through the baffle 74 in a position so that, when the settler plate 60 is arranged in the clarifier 2 or plate pack 50, as generally illustrated in FIG. 4G, liquid 42 containing the solid 40 impurities (as an influent) is introduced into the channel 56 above solid particles 40 which have already separated from the liquid 42 and have settled on (or are sliding down) the settling surface 62. Accordingly, in one embodiment, the port 82 is spaced a predetermined distance from the distal portion 76 of the baffle 74. Optionally, the port 82 is at least approximately 0.2 inches from the baffle distal portion 76. In this manner, the port 82 is above a settling surface 62 of an adjacent settler plate 60. Positioning the port 82 in this manner is beneficial because the liquid 42 with the solids 40 can be introduced into the channel 56 in a manner which inhibits (and preferably, prevents) disrupting or disturbing solids 40 that have already separated from liquid 42 in the channel. More specifically, by spacing the port 82 from the baffle distal portion 76, turbulence or eddy currents at or near a settling surface 62 of an adjacent settler plate 60 that results from the flow of liquid 42 through the port into a channel 56 can be reduced. Reducing turbulence near the settling surface 62 can increase the speed at which the solids 40 settle out of the liquid 42, increasing the efficiency of the settler plate of the present disclosure.

Figure 9:
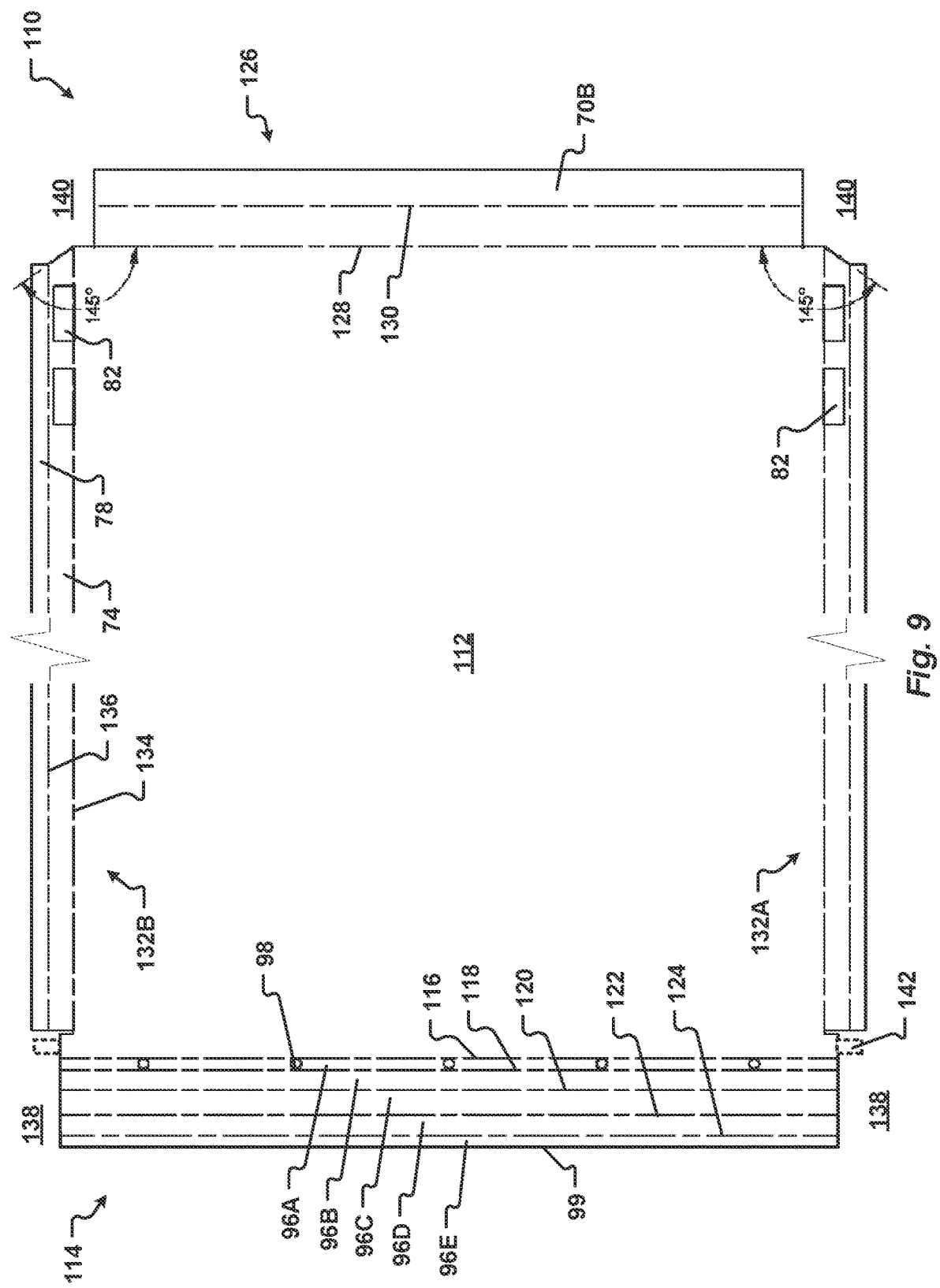
FIG. 9 is a top plan view of a blank of the present disclosure that can be formed into a settler plate of one embodiment.

Referring now to FIG. 4F, a stiffening feature 70 can extend from the lower end 68 of the settling surface 62. In one embodiment, the stiffening feature 70 is integrally formed with the settling surface. For example, the stiffening feature 70 can be formed by bending or rolling a tab 126 (such as illustrated in FIG. 9) extending from the settling surface 62. The stiffening feature 70 can be oriented approximately perpendicular to the baffle end 80. In this manner, when a settler plate 60 is positioned in a plate pack 50 or clarifier 2, the stiffening feature can be oriented approximately vertically.

The stiffening feature 70 can be of any size and shape. Optionally, the stiffening feature 70 can have a cross-section that is generally rectangular, such as generally illustrated in FIG. 4F. The stiffening feature 70A can be formed by bending a tab 126 of a blank 110 four or more times. Alternatively, the stiffening feature may have a cross-section that is round, triangular, or square. In one embodiment, the stiffening feature 70 is generally flat. For example, the stiffening feature 70B can be formed by bending a first portion of the tab against a second portion of the tab such as in the embodiment illustrated in FIG. 4G. Accordingly, the stiffening feature 70B illustrated in FIG. 4G can comprise two or more layers or thicknesses of a blank 110 from which the settler plate 60 is formed.

Referring now to FIG. 4H, the settler plates 60 can be spaced along the longitudinal axis 20 of the basin 4. Each of the adjacent hollow supports 90 is shown carrying one of the settler plates 60 such that the settling surfaces 62 are substantially parallel. The settler plates 60 can be arranged adjacent to each other and together define channels 56 between the adjacent settler plates 60. The baffles 74 (illustrated in broken lines for clarity) of the settler plates contact the settling surfaces 62 of adjacent settler places to form a wall. The wall causes the liquid 42 to enter the channels 56 through the side ports 82.

As the solids 40 and the liquid 42 flow upwardly from the ports 82 within the channels 56, the solids 40 settle from the liquid 42 onto the settling surface 62. The solids 40 then slide down the settling surface to the bottom 14 of the basin 4 as generally indicated by arrow 47. The clarified liquid 42C continues to flow upwardly to an outlet 58 extending between a hollow support 90 of one settler plate and a settling surface 62 of an adjacent settler plate. Optionally, the outlet 58 can have a width of between approximately 0.10 inches and 0.50 inches, or between approximately 0.25 inches and approximately 0.375 inches.

In one embodiment, in which the orifices 98 are formed in the first segment 96A, the clarified liquid 42C can flow above the first segment 96A of the hollow support. The clarified liquid 42C can assume a level 48A in the basin 4 above the first segment 96A of the hollow support 90. Accordingly, there may be some commingling of clarified liquid 42C from one channel 56 with clarified liquid from another flow channel. The level 48A of the liquid 42C can be controlled to be between approximately 2 inches to approximately 6 inches above the top surface of the first segment 96A. Submerging the settler plates 60 and the hollow supports 90 in this manner can beneficially eliminate an air/water interface and thereby prevent or reduce corrosion of the settler plates. Forming a volume of clarified liquid 42C above the hollow supports 90 can also create a pressure head above the settler plates 60 and improve the flow of the clarified liquid into the hollow supports. For example, the clarified liquid 42C flowing through the orifices 98 can create a substantially uniform headloss across the width 64 of the settling surface 62. In one embodiment, the flow of clarified liquid 42C into the hollow supports 90 reduces the pressure head by up to approximately 0.5 inches.

Figure 4I:
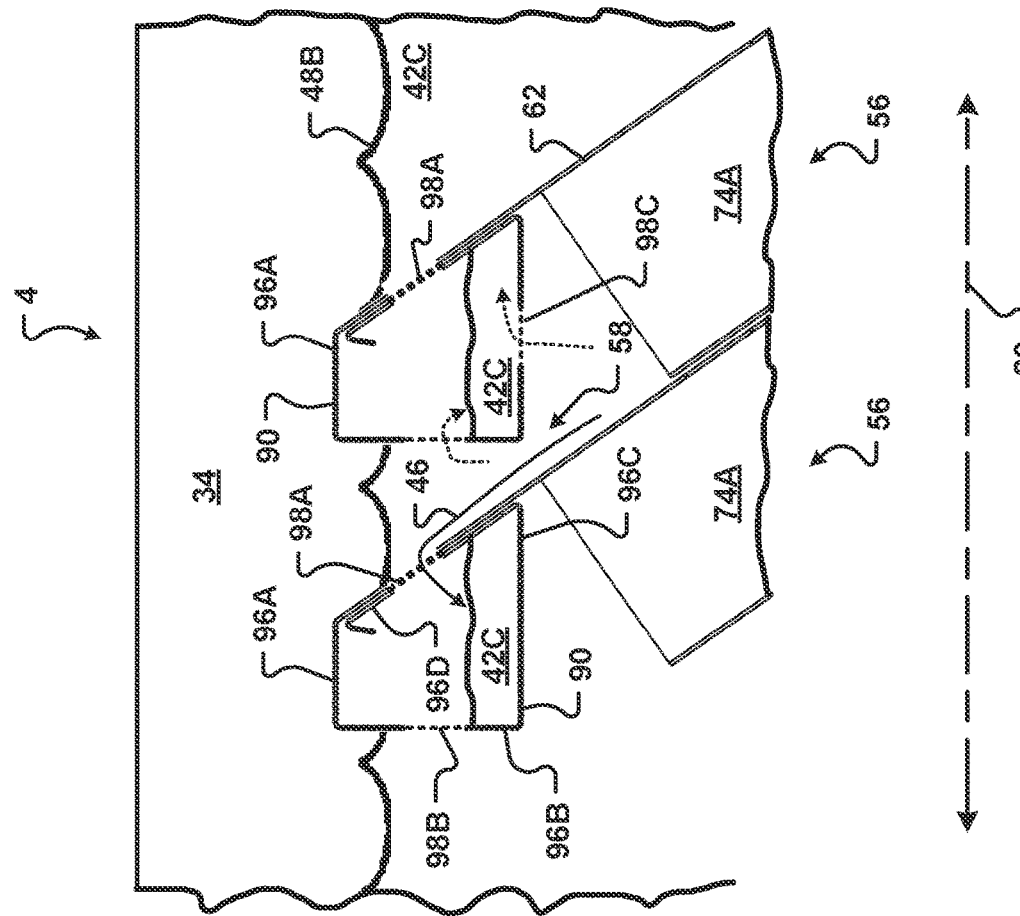
FIG. 4I is a side elevation view similar to FIG. 4H and illustrating an orifice formed in the hollow support according to another embodiment.

Referring now to FIG. 4I, another embodiment of a hollow support 90 of the present disclosure is illustrated in which orifices 98A, 98B are formed through at least one of the settling surface 62 and the second segment 96B. Accordingly, the clarified liquid 42C can assume a level 48B below the first segment 96A of the hollow support 90. Optionally, the level 48B of the clarified liquid 42C can be adjusted to be from approximately 0.125 inches to approximately 0.25 inches below the top of the first segment 96A. With the fluid level 48B in that range, the clarified liquid 42C between the adjacent settler plates 60 does not completely submerge the hollow supports 90. In this manner, the clarified liquid 42C does not flow over either or both of the hollow supports 90. Rather, all of the clarified liquid 42C flows upwardly from one of the channels 56, flows through the outlet 58 between a hollow support 90 and an adjacent settling surface 62, and flows into an opening or orifice 98A, 98B in one of the hollow supports 90. Optionally, the clarified liquid 42C can also flow through an optional orifice 98C in the third segment 96C.

Because the fluid level 48B is lower than the top of the hollow support 90, the clarified liquid 42C can directly and completely flow into and through the orifice 98A or 98B. Thus, in this embodiment, normally none of the clarified liquid 42C from the outlet 58 of the channel 56 flows completely over either or both of the hollow supports 90, such that there is no commingling of clarified liquid 42C from the channel 56 with clarified liquid 42C from another one of the channels 56. Keeping the fluid level 48B lower than the top of the hollow support 90 also beneficially keeps the top deck of a plate pack 50 formed by the first segment 96A dry which may reduce or prevent growth of algae or other biological matter on the hollow supports 90.

Figure 5:
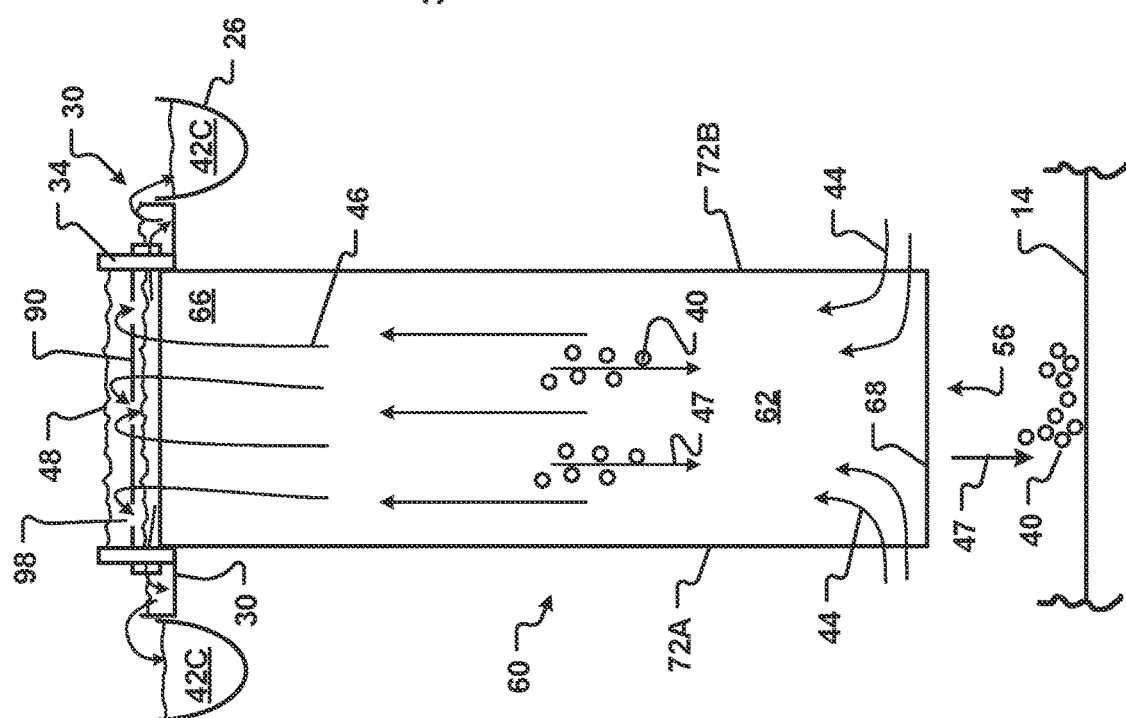
FIG. 5 is an elevation view showing the flow of liquid and solids along a settler plate and clarified liquid flowing into a hollow support according to embodiments of the present disclosure.

Referring now to FIG. 5, the flow of liquid in a channel 56 along a settling surface 62 of a settler plate 60 is generally illustrated. Near the upper end of the settler plate, clarified liquid 42C flows into a hollow support 90 associated with the settler plate. Once in the hollow interior of the hollow support 90, the clarified liquid 42C flows laterally toward an outlet trough 26 positioned proximate to one or both lateral sides 72 of the settler plate 60. A baffle 34 can optionally be provided at lateral sides of the settler plate 60. The baffle 34 can extend upwardly above the hollow support 90 of the settler plate. In this manner, a head of clarified liquid 42C can collect above the hollow support.

Optionally, a weir 30 is provided with the troughs 26. The clarified liquid 42C can flow over the weir 30 into the trough 26. Optionally, the weir 30 can be adjusted to alter the level 48 of the clarified liquid 42C. For example, the position of the weir can be adjusted higher or lower relative to the trough 26 to allow the level 48 of the clarified liquid 42C to be set according to the particular level 48 that is desired (such as generally illustrated in FIGS. 4H and 4I).

Clarified liquid 42C from a channel 56 can be sampled to determine if the settler plates 60 need servicing or replacement. In one embodiment, if it is found by such sampling that too many solids 40 are present in the clarified liquid 42C from a channel 56, then one or both of the settler plates 60 and the associated hollow supports 90 that define that flow channel 56 can be removed for cleaning or replacement. Optionally, the settler plates 60 can be releasably retained by the clarifier 2. In this manner, the servicing operations of removal and replacement of one or both such fouled settler plates 60 can be performed without interrupting or substantially impairing the normal settling operations of the other flow channels 56. For example, after removing a settler plate 60, a plug (not illustrated) can be placed in a trough inlet 32 formed through a baffle 34 associated with the weir 30. In this manner, flow of clarified fluid through the trough inlet 32 (illustrated in FIG. 6) can be blocked.

Figure 6:
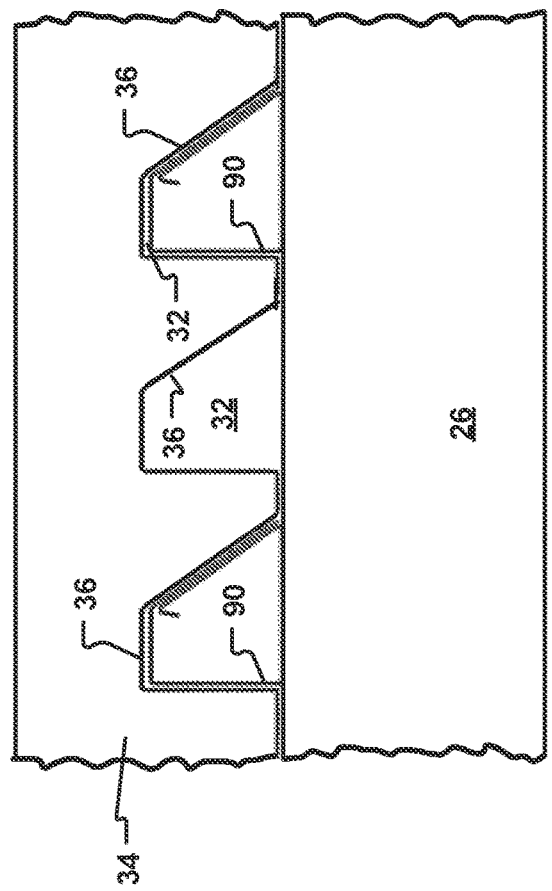
FIG. 6 is a side elevation view of a portion of a trough of a clarifier and showing hollow supports retained in a predetermined alignment relative to the trough.

In one embodiment, to facilitate removal of a fouled settler plate 60 and the corresponding hollow support 90, FIG. 6 depicts an embodiment of the trough 26 in which the respective hollow supports 90 are removable from the trough 26. The upper end of the trough 26, which may be the weir 30 for example, includes an upper mounting plate or baffle 34. The baffle 34 can optionally be configured to be removably interconnected to the trough 26 or a portion of the weir 30. A lower surface of the baffle 34 is shaped to define a series of recesses 36. Each recess 36 is adapted to fit over, or receive, one of the hollow supports 90 and to space such hollow support 90 from an adjacent hollow support 90 according to the desired width of the channels 56. The recesses 36 can have a shape adapted to substantially conform to the shape of the external surface of all hollow supports 90 of present disclosure. In this manner, a seal can be formed by the trough 26 and baffle 34 with an exterior surface of the hollow support 90. After the baffle 34 is placed over the hollow supports 90, the baffle 34 can be fastened to secure the hollow supports 90 to the trough 26. Optionally, depending on the cross-sectional shape of the hollow supports 90, an upper surface of the trough 26 can include projections, recesses or depressions (not illustrated) to conform to a portion of the external surface of the hollow supports.

In one embodiment, to remove any of the hollow supports 90 of the clarifier 2, the baffle 34 can be removed from the trough 26. The desired hollow support 90 can then be removed exposing a trough inlet 32 formerly connected to the now-removed hollow support 90. This is generally illustrated in FIG. 6 in which a hollow support has been removed to leave a vacant inlet 32 in between two adjacent hollow supports 90. Once the desired hollow support 90 is removed, a plug (not illustrated) with a shape corresponding to the inlet 32 can be inserted to block the inlet. Alternatively, the settler plates 60 can be fixedly joined to the baffle 34. In one embodiment, the hollow supports 90 can be welded to the inlets 32 of the baffle 34.

Figure 8:
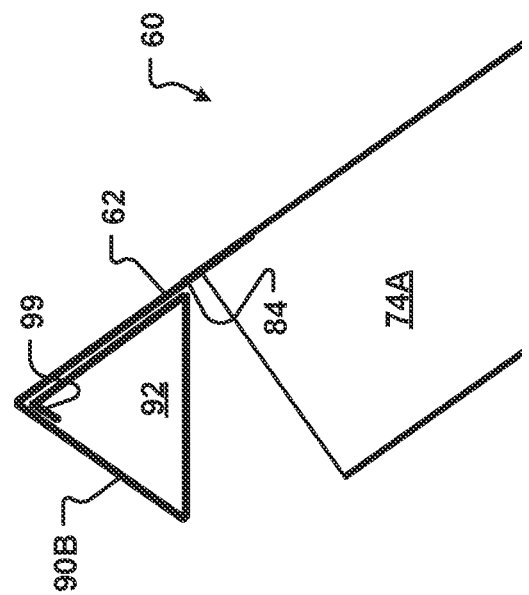
FIG. 8 is another partial side elevation view illustrating a settler plate with a triangular hollow support of another embodiment of the present disclosure.
Figure 7:
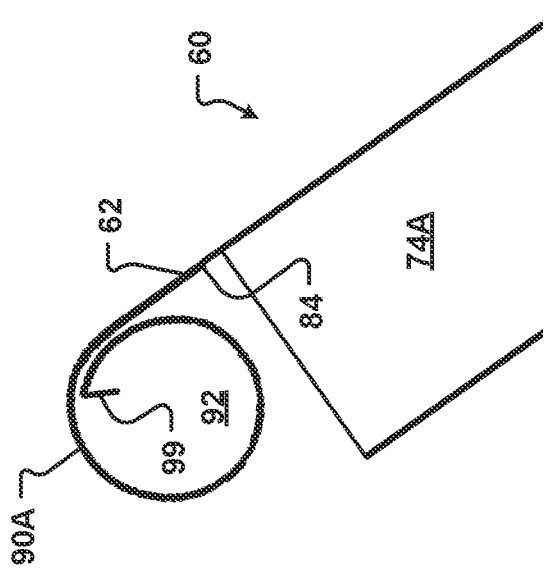
FIG. 7 is a partial side elevation view of a settler plate including a cylindrical hollow support according to one embodiment of the present disclosure.

Referring now to FIGS. 7-8, settler plates 60 according to other embodiments of the present disclosure are illustrated. More specifically, FIG. 7 illustrates a portion of a settler plate 60 that includes a hollow support 90A that has a generally cylindrical shape. The hollow support 90A can be integrally formed with the settling surface 62. For example, the cylindrical hollow support 90A can be formed by rolling a tab that extends from the upper end 66 of the settling surface 62. Alternatively, the cylindrical hollow support 90A can be formed by folding or bending the tab a plurality of times. Regardless, a free end 99 of a tab 114 (such as illustrated in FIG. 9) used to form the hollow support 90A extends proximate to a back surface 84 of the settling surface. The free end 99 can extend within the hollow interior 92 of the hollow support 90A.

FIG. 8 illustrates a portion of another settler plate 60 that includes a hollow support 90B with a cross section that is generally triangular. The triangular hollow support 90B can be integrally formed with the settling surface 62 by bending a tab 114 that extends from the settling surface 62 into a desired shape. In one embodiment, the triangular hollow support 90B is formed by bending the tab 114 at least two times. A free end 99 of the tab can extend within a hollow interior 92 of the hollow support 90B.

Although not illustrated, the settler plates 60 illustrated in FIGS. 7-8, can include orifices 98 and or a mechanical fastener 86 that are the same as, or similar to, the orifices and optional mechanical fastener 86 of the settler plate 60 described in conjunction with FIGS. 4A-4I. For example, one or more orifices 98 can be formed in a variety of locations of the cylindrical hollow support 90A. Similarly, an orifice 98 can be formed through one or more of the three sides of the triangular support 42B.

Referring now to FIG. 9, a blank 110 of an embodiment of the present disclosure is generally illustrated. The blank 110 can be formed into a settler plate 60 of embodiments of the present disclosure. In one embodiment, the blank 110 is formed of a 20 to 26 gauge material, or a 24 gauge material. The material of the blank 110 can be a stainless steel alloy, such as a 304 stainless steel alloy. Alternatively, the blank can be formed of carbon steel, aluminum, or bendable plastic, such as Acrylonitrile butadiene styrene (ABS). The blank 110 can have a length of between approximately 90 inches and approximately 140 inches. A width of the blank can be between approximately 40 inches and approximately 80 inches. The blank 110 is generally planar.

The blank 110 generally includes a central sheet 112, a first end tab 114, a second end tab 126 and two lateral tabs 132A, 132B. The central sheet 112 can form a settling surface 62 of a settler plate 60. Notches 138 can be formed between the first end tab 114 and the lateral tabs 132. Similarly, mitered notches 140 can be formed between the second end tab 126 and the lateral tabs. The notches 138, 140 can be provided to facilitate bending of the tabs 114, 126, 132 into predetermined shapes. Ports 82 for effluent can optionally be formed in the blank 110. Although the ports 82 are illustrated with a rectangular shape, the ports can have a circular shape.

A plurality dashed lines are shown. Each dashed line represents an axis of bending, or bend axis, for a location at which the blank can be bent or folded to form the settler plate 60.

The first end tab 114 generally includes one or more bend axes 116, 118, 120, 122, and optionally 124. The bend axes indicate locations at which the first end tab 114 can be bent to form a hollow support, such as generally illustrated in FIG. 4E. More specifically, the axes 116-124 generally define the first through fifth segments 96A—96E of the hollow support. Optionally, one or more orifices 98 can be formed in the first end tab 114. In one embodiment, at least one orifice 98 is formed between the first bend axis 116 and the second bend axis 118.

Referring now to FIGS. 10A-10F, the hollow support 90 can be formed by bending the first end tab 114 proximate to the bend axes 116-124. Any bending or folding apparatus can be used. One example of a suitable folding machine that can be used to form a blank 110 into a settler plate 60 is an RAS XLTbend. Other suitable folding machines are known to those of skill in the art.

Figure 10A:
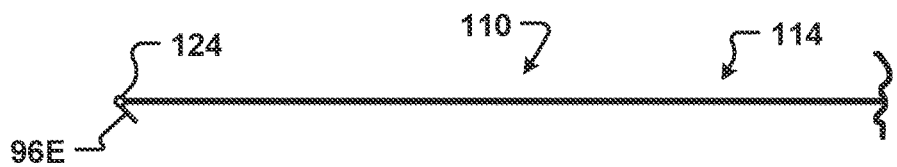
FIGS. 10A-10F are side elevation views of a portion of the blank of FIG. 9 being formed into a hollow support of one embodiment of the present disclosure.
Figure 10B:
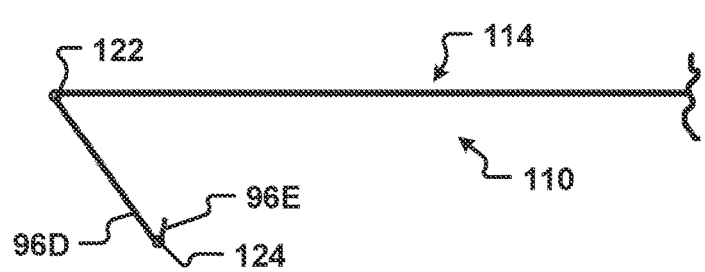
Figure 10C:
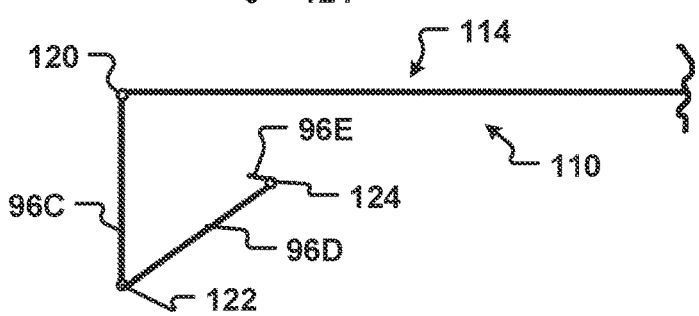
Figure 10D:
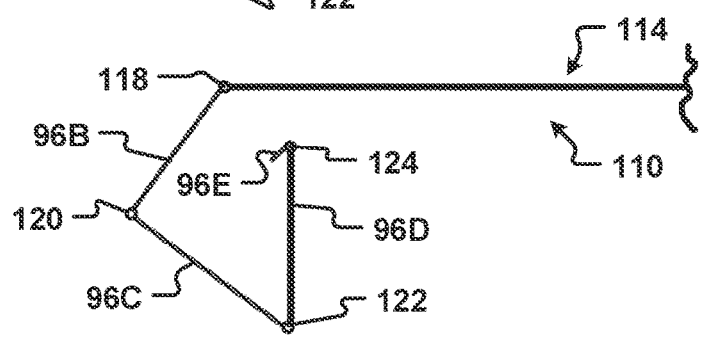

Referring now to FIG. 10A, in one embodiment, the hollow support of the present disclosure is formed by bending an outer portion of the first end tab 114 around the fifth axis 124 to define the fifth segment 96E. The first end tab 114 can be bent or folded at an angle of approximately 135° at the fifth axis 124. The first end tab 114 can also be bent or folded at the fourth axis 122 to define the fourth segment 96D as shown in FIG. 10B. Optionally, the first end tab 114 is bent or folded at an angle of approximately 125° at the fourth axis 122. Similarly, the first end tab 114 can be bent or folded at the third axis 120, the second axis 118, and the first axis 116 to form the third segment 96C, second segment 96B, and the first segment 96A. The first end tab 114 can be bent by approximately 90° at the third axis 120, approximately 90° at the second axis 118, and approximately 55° at the first axis 116.

Figure 10E:
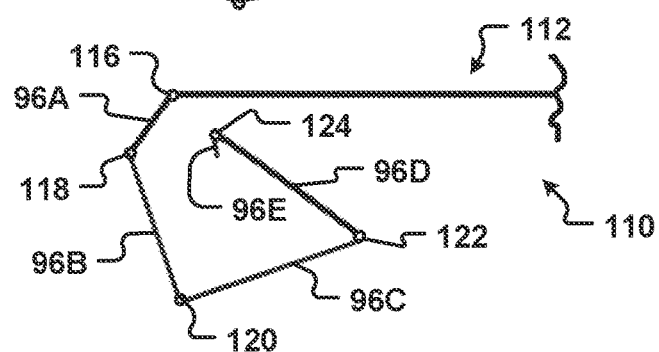
Figure 10F:
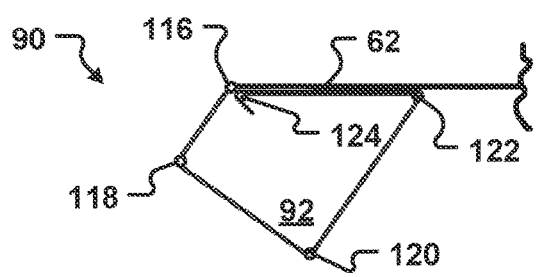

The bending or folding at the bend axes 116-124 can be performed in one or more operations. More specifically, in one embodiment generally illustrated in FIG. 10D, the first end tab 114 can be bent a first time at the second axis 118. Referring to FIG. 10E, the first end tab 114 can then be bent by approximately 55° at the first axis 116. The first end tab 114 can then be bent a second time at the second axis 118 as shown in FIG. 10F. In this manner, the hollow support 90 can be formed without the material of the first end tab 114 interfering with operation of a bend or folding apparatus used to perform the bending or folding. In one embodiment, the tab is bent by approximately 45° during the first bend at the second axis 118. The second bend at the second axis 118 can also be by approximately 45°.

Returning to FIG. 9, the second end tab 126 can be formed into a stiffening feature 70 of embodiments of the present disclosure. In one embodiment, the second end tab 126 can be bent or folded approximately in half at the seventh axis 130, or by approximately 180°. Optionally, the second end tab 126 can be folded in half one or more additional times. The second end tab 126 can next be bent or folded by approximately 35° at the sixth axis 128. In this manner, the stiffening feature 70B of the embodiment illustrated in FIG. 4G can be formed.

Alternatively, the second end tab 126 can be bent to form the stiffening feature 70 as generally illustrated in FIG. 4F. In one embodiment, the second end tab 126 is bent at least four times to form the stiffening feature 70A.

The lateral tabs 132 can be bent one or more times to form baffles 74 of embodiments of the present disclosure. More specifically, the lateral tabs 132 can be bent or folded by approximately 90° at the eighth axis 134 to define the baffles 74 of the present disclosure. In one embodiment, the lateral tabs 132 are bent or folded by approximately 90° at the ninth axis 136 to form flanges 78.

Referring now to FIGS. 11-16, a settler plate 60 of another embodiment of the present disclosure is generally illustrated. The settler plate 60 includes many of the same, or similar, features as the embodiments of the settler plates 60 described in conjunction with FIGS. 2-10. The settler plate 60 operates in a similar manner as the settler plates of other embodiments described herein and provides similar benefits and advantages.

Figure 11:
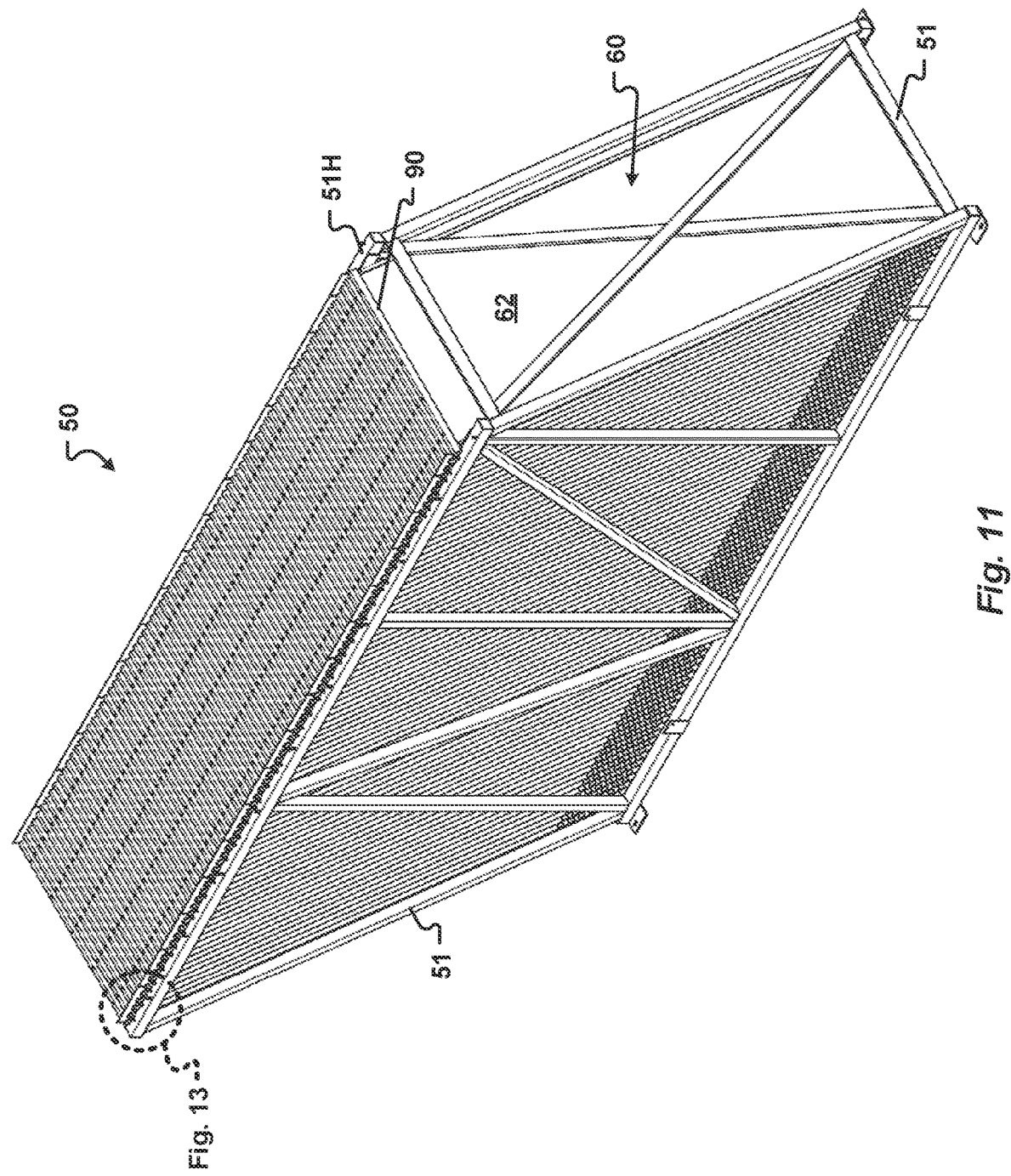
FIG. 11 is a perspective view of a plate pack one an embodiment of the present disclosure.
Figure 12:
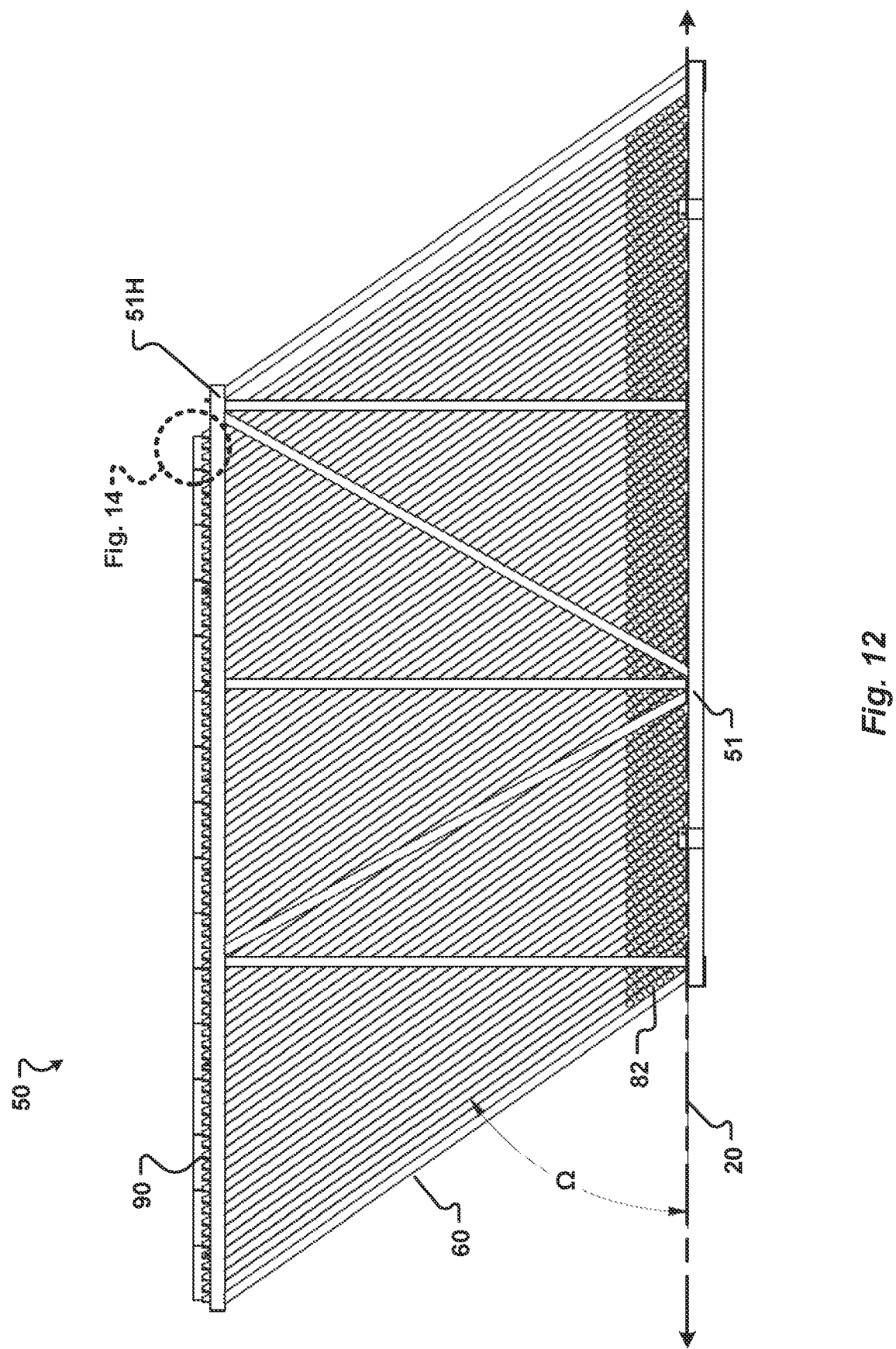
FIG. 12 is a side elevation view of the plate pack of FIG. 11.

Referring now to FIGS. 11-12, a plate pack 50 of another embodiment of the present disclosure is generally illustrated. The plate pack 50 comprises a plurality of settler plates 60 supported by a frame 51. In one embodiment, the plate pack 50 includes from approximately eight to approximately one hundred forty settler plates. Optionally, a cover (such as the cover 52 illustrated in FIG. 2) can be used with the plate pack 50. The plate pack 50 can be installed in a basin 4 with, or in place of, a clarifier section 16 such as described in conjunction with FIG. 1.

The plate pack 50 is adapted to retain the settler plates in a predetermined orientation. More specifically, the frame 51 holds the settler plates 60 at a predetermined angle 1 relative to a horizontal axis 20. In one embodiment, the angle 1 is between approximately 45° and approximately 65°. In another embodiment, the angle is approximately 55°. Each settler plate 60 is approximately parallel to an adjacent settler plate.

Figure 13:
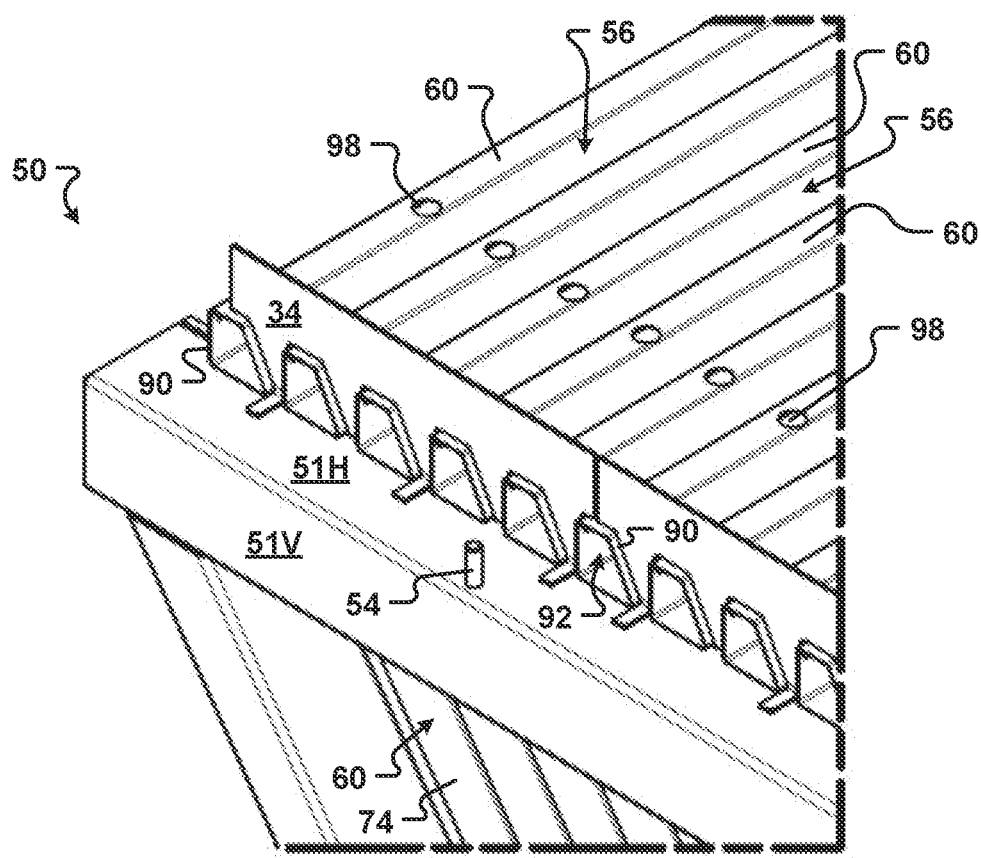
FIG. 13 is an enlarged perspective view of a portion of the plate pack of FIG. 11.
Figure 14:
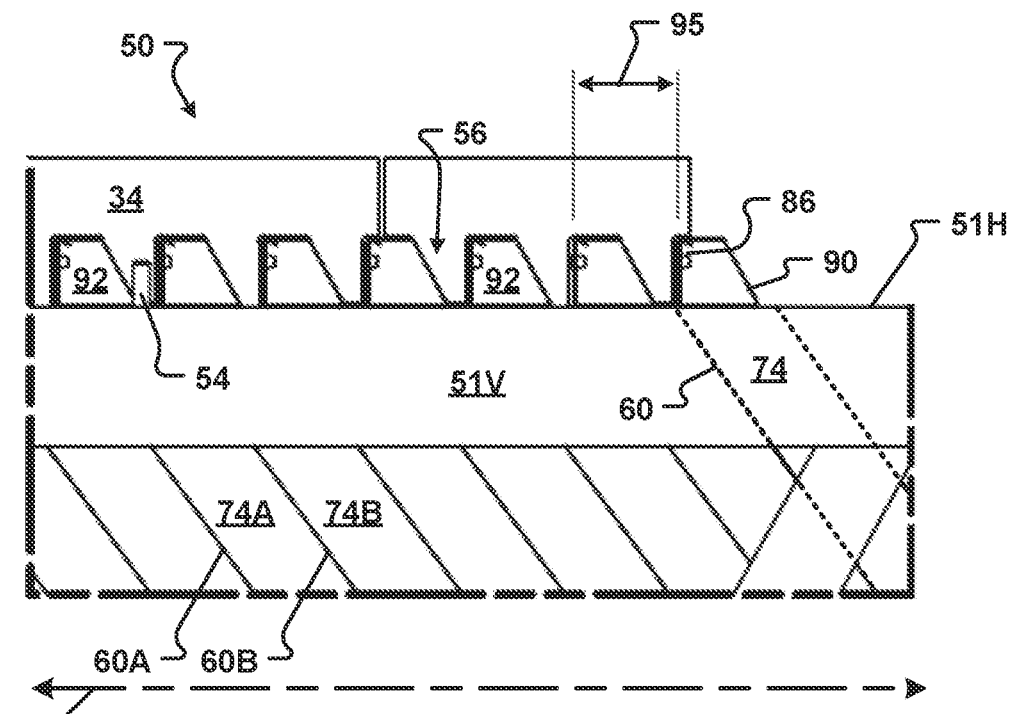
FIG. 14 is an enlarged side elevation view of the plate pack of FIG. 12.

Referring now to FIGS. 13-14, portions of the plate pack 50 and settler plates 60 of an embodiment of the present disclosure are generally illustrated. Each settler plate 60 includes a hollow support 90. The hollow supports 90 are configured to carry one settler plate 60 in the frame 51. In one embodiment, a portion of the hollow support 90 extends over a horizontal portion of the frame 51H of the plate pack 50 as generally illustrated.

The hollow support can be fastened or affixed to the settler plate. More specifically, the hollow support can be affixed to the settler plate by a weld, a rivet, a bolt, a screw, a mechanical interlocking attachment, an adhesive, and other known attachment means. In one embodiment, a mechanical fastener 86 can extend through a portion of the settler plate into the hollow support 90. Additionally, or alternatively, in one embodiment a hollow support 90 can be integrally formed at an upper end of a settler plate 60.

Adjacent hollow supports 90 carry respective adjacent settler plates 60 in a predetermined alignment to define one channel 56. In one embodiment, a distance 95 between hollow supports 90 of adjacent settler plates is between approximately 2.0 inches and 2.5 inches, or approximately 2.25 inches.

Opposite ends of each hollow support 90 are engaged with the frame and direct clarified liquid from a channel between the settler plates to a trough (such as illustrated in FIG. 1). Although not illustrated in FIGS. 13-14 for clarity, a trough and/or a weir can be positioned proximate to a vertical portion 51V of the frame in a manner similar to that shown in FIG. 5. In one embodiment, a trough and a weir are interconnected to the horizontal portion 51H of the frame 51. Optionally, the trough and weir may be interconnected to a projection, such as a pin or stud 54, of the horizontal portion 51H.

The engagement of the hollow support to the frame can be removable as described herein. Alternatively, the hollow supports 90 can be fixed to the plate pack 50. Specifically, the hollow support 90 can be joined to a portion of the frame 51, such as a support element or baffle 34 (known as a comb) by a fastener, a mechanical interlocking attachment, a weld, or other means.

Referring now to FIGS. 15A-15G, settler plates 60 of an embodiment of the present disclosure are generally illustrated. A settler plate 60 includes a settling surface 62 with an upper end 66, a lower end 68, and lateral sides 72. The settling surface 62 can have a shape that is generally rectangular and substantially planar.

In one embodiment, the settling surface 62 has a length of between approximately 100 inches and approximately 130 inches, or approximately 114 inches. Optionally, the settling surface has a width 64 of between approximately 44 inches and approximately 64 inches, or approximately 54 inches. The settling surface 62 is generally smooth to facilitate movement of solids 40 that collect on the settling surface 62 toward the lower end 68. Optionally, a coating can be added to the settling surface 62 to prevent, or reduce the likelihood, of solids sticking. In one embodiment, the coating can be a polytetrafluoroethylene (PTFE) (such as Teflon), a silicone, an enamel, or a ceramic. In one embodiment, the settling surface is polished.

The settler plate 60 can be made of any suitable material, such as one or more of stainless steel, fiber reinforced composites, plastic, polyvinyl chloride (PVC), carbon steel, and aluminum. In one embodiment, the settler plate 60 comprises a 304 stainless steel alloy. The material from which the settler plate 60 is formed can have a thickness of between approximately 0.015 inches and 0.035 inches. Optionally, the settler plate 60 is formed of a 20 to 26 gauge material. In one embodiment, the settle plate is manufactured from a 24 gauge stainless steel alloy.

A hollow support 90 extends from the settler plate 60 proximate to the upper end 66. The hollow support 90 includes a hollow interior 92. In one embodiment, the hollow support 90 projects or extends away from the settling surface 62. For example, the hollow interior 92 can be positioned to extend above the settling surface 62 of the settler plate. More specifically, the hollow support 90 can be formed such that a plane contacting the back surface 84 is not interrupted by the hollow support. Said differently, the hollow support can be oriented such that no portion of the hollow support 90 contacts the plane contacting the back surface.

A width 94 of the hollow support can be greater than the width 64 of the settling surface. For example, the width 94 of the hollow support 90 can be between approximately 46 inches and approximately 66 inches, or approximately 56 inches. Accordingly, at least a portion of the hollow support 90 can extend beyond one or both baffles 74 positioned at the lateral sides 72 of the settling surface 62 as generally illustrated in FIG. 15D. In one embodiment, the width 94 of the hollow support 90 is at least approximately 3% greater than the width 64 of the settling surface.

In one embodiment, the hollow support 90 is integrally formed with the settling surface 62. For example, the hollow support 90 can be formed by altering the shape of a tab 114 extending from the upper end 66 as generally described in conjunction with FIG. 16.

Figure 15E:
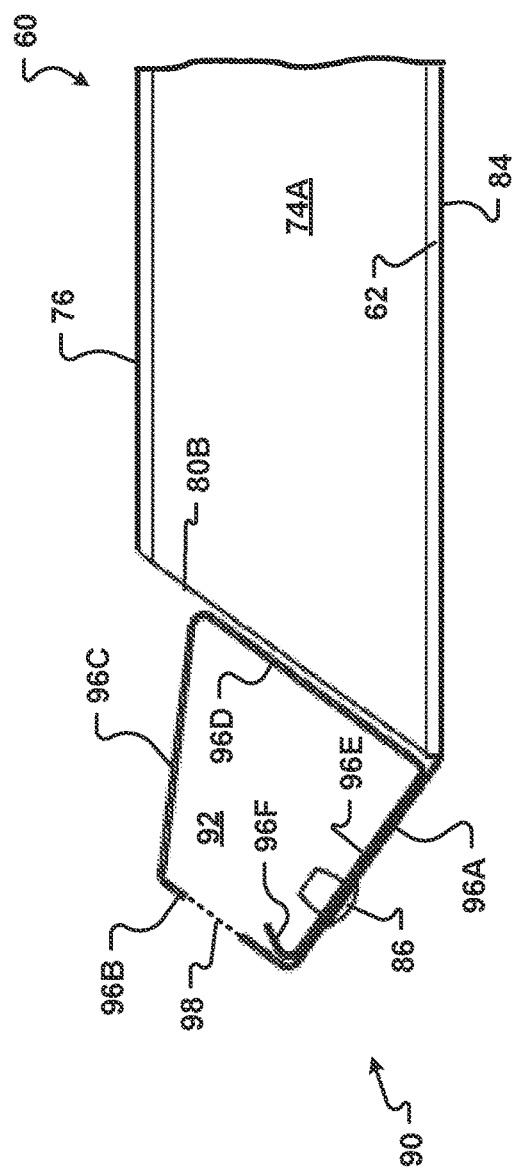
FIG. 15E is an expanded side elevation view of a portion of the settler plate of FIG. 15C illustrating a hollow support of one embodiment of the present disclosure.

The hollow support 90 is illustrated in FIG. 15E with four exterior sides. Optionally, the hollow support 90 can have a cross-section of a trapezoid. However, the hollow support 90 can have other configurations with more, or fewer sides. In one embodiment, the hollow support 90 has a cross-sectional shape of a regular or irregular polygon.

Referring now to FIG. 15E, in one embodiment the hollow support 90 includes a number of segments 96 formed by bending or folding the tab extending from the settling surface 62. For example, the hollow support 90 can comprise a first segment 96A interconnected to the settling surface 62. An interior angle between the first segment 96A and the settling surface 62 may be between approximately 140° and approximately 150°, or approximately 145°.

A second segment 96B can extend from the first segment. In one embodiment, the second segment is approximately perpendicular to the first segment.

A third segment 96C of the hollow support 90 can extend from the second segment 96B. In one embodiment, and interior angle between the second segment and the third segment is between approximately 116° and approximately 120°, or approximately 118°.

A fourth segment 96D can run from the third segment 96C. An interior angle between the third and fourth segments may be between approximately 60° and approximately 64°, or approximately 62°. Accordingly, the fourth segment 96D may optionally be oriented approximately parallel to the second segment 96B.

Additionally, a fifth segment 96E can extend inwardly from an end of the fourth segment 96D. In one embodiment, the fifth segment is approximately perpendicular to the fourth segment. The fifth segment 96E can extend approximately parallel to the first segment 96A. Optionally, at least a portion of the fifth segment can contact the first segment.

In one embodiment, when the settler plate 60 is positioned in a plate pack 50, one or more of the second segment 96B and the fourth segment 96D can be approximately horizontal, or parallel to longitudinal axis 20, as generally illustrated in FIG. 14. Additionally, or alternatively, the first and fifth segments 96A, 96E may be approximately perpendicular to the longitudinal axis 20.

Optionally, a sixth segment 96F may extend from the fifth segment. In one embodiment, an interior angle between the fifth and sixth segments is between approximately 25° and approximately 65°. The sixth segment 96F is configured to increase the stiffness of one or more of the segments 96 and of the hollow support 90. For example, the sixth segment 96F can increase the stiffness of the hollow support 90 such that the settling surface 62 and the other segment 96A-96E do not bend or deform if a mechanical fastener 86 is added to the hollow support. Accordingly, in one embodiment, because of the sixth segment 96F, the hollow support 90 can be formed of less (or thinner) material without decreasing the strength of the hollow support, beneficially reducing the material expense of the settler plate 60.

Each segment is joined to one or more adjacent segments or the settling surface by a predetermined radius of curvature. In one embodiment, each radius of curvature is between approximately 1/32 of an inch and approximately 3/32 of an inch, or approximately 1/16 of an inch.

The first segment 96A can have a length of between approximately 1.40 inches and 1.60 inches. The second segment 96B is generally shorter than the first segment. In one embodiment, the second segment 96B has a length of between approximately 0.90 inches and 1.10 inches. The third segment 96C can have a length of between approximately 1.40 inches and approximately 1.6 inches. Optionally, the fourth segment 96D has a length of from approximately 1.60 inches to 1.90 inches. The fifth segment 96E may have a length of from approximately 1.3 to 1.5 inches. The sixth segment 96F can optionally have a length of about 0.25 inches.

At least one of the first-sixth segments is generally planar. Additionally, or alternatively, one or more of the segments can have a shape that is not planar. For example, in one embodiment, at least one of the segments 96A—96F is curved or arched.

Optionally, at least one of the segments 96 of the hollow support 90 can be affixed or fastened to another segment. For example, in one embodiment, the first segment 96A is attached to the fifth segment 96E with a mechanical fastener 86. The mechanical fastener can be a rivet 86 or the like. Alternatively, the mechanical fastener 86 can be a screw or bolt. Optionally, five fasteners 86 are positioned through the first and fifth segments.

Additionally, or alternatively, the fifth segment 96E can be joined to the first segment 96A by any other suitable means. In one embodiment, the fifth segment is joined to the first segment with one or more of an adhesive, a glue, a weld, or a solder. In one embodiment, a projection 142 (illustrated in FIG. 16) extending from a lateral side 72 of a metal blank 110 from which the settler plate is formed can be bent around the fifth segment 96E after the hollow support 90 is formed to pinch or draw the fifth segment against the first segment.

In another embodiment, no mechanical fasteners penetrate the segments 96 of the hollow support 90. Accordingly, fewer operations are performed when forming the hollow support 90 which decreases the cost of the settler plate 60.

An orifice 98 is formed through the hollow support 90 to direct clarified liquid into the hollow interior 92. The hollow support 90 can include any number of orifices 98. The size and number of orifices can be selected to restrict the flow of clarified liquid 42C into the hollow support 90 to a predetermined rate according to the anticipated range of flow rates of the liquid 42 and the solids 40 into the basin 4. In this manner, the desired flow rate of clarified liquid 42C through the orifices 98 is obtained. For example, flow rates of from about 1 GPM to about 2 GPM into a hollow support 90 through the orifices 98 of a plate settler 60 can be achieved.

In one embodiment, from four to ten orifices 98 are formed in the hollow support 90. Optionally, the hollow support 90 can have five orifices 98. The orifices 98 can be substantially evenly spaced across the width 64 of the settling surface 62. By spacing the orifices 98 across the settling surface width 64, the flow of liquid 42 can be metered across the width of the settler plate 60 to facilitate even flow of the liquid as it rises up along the settling surface 62. The even flow of clarified liquid through the orifices 98 into the hollow support 90 establishes a constant upward flow and even distribution across the width of the settling surface 62. The constant upward flow of liquid through the channels 56 between adjacent settler plates 60 eliminates dead zones on the settling surfaces 62 and ensures full utilization of the surface area of the settling surfaces.

The orifices also create a headloss which is required for even flow and smooth operation of the clarifier 2. Further, the orifices create an equalized distribution of clarified liquid across the entire surface of the plate pack 50.

In contrast, some prior art settler plates allow liquid to collect above the tops of the plates. This can restrict the flow of liquid and create areas of uneven flow along the settler plates, reducing the efficiency of the settler plates.

In one embodiment, at least one orifice 98M can be formed in a median portion of the width 64 of the hollow support 90 as generally illustrated in FIG. 15D. The median orifice 98M can be (but is not necessarily) substantially centered on the width 94 of the hollow support. Clarified liquid 42C flowing upward in a median portion of a channel 56 can then enter the hollow support 90 through the median orifice 98M before flowing laterally toward one of the lateral sides 72 of the settler plate 60. This can beneficially prevent a restriction in the upward flow of the liquid 42 in the channel 56 and thus can promote a substantially uniform upward flow rate of the liquid across the width 64 of the settler plate. Said differently, the clarified liquid 42C can be evenly drawn into the hollow support 90 through orifices 98 across the width 64 of the settling surface 62. In one embodiment, the liquid 42 can flow less than approximately 7 inches laterally (or less than about ⅛th of the width 64) to reach an orifice 98 to flow into the hollow support 90.

The orifices 98 can be of any shape and dimension. In one embodiment, the orifices can be generally circular, oval, square, or elongated slots. Optionally, each orifice 98 has a width or diameter of between approximately 0.5 inches to approximately 0.8 inches. In one embodiment, the orifices 98 have a total surface area or cross-sectional area of between approximately 1.2 square inches to approximately 2.7 square inches. The orifices can be formed by punching or drilling through the hollow support.

The orifice 98 can be formed through any one or more segments 96 of the hollow support. In one embodiment, the orifice 98 is formed through the second segment 96B as generally illustrated in FIG. 15E. Accordingly, the orifice 98 will generally face upwardly when the settler plate 60 is positioned in a clarifier 2. Additionally, or alternatively, an orifice 98 can be formed through the first and fifth segments 96A, 96E or optionally the third segment 96C of the hollow support.

In one embodiment, one or more of the orifices 98 can include a closure configured to selectively seal the orifice. In this manner, an operator can open or close one or more of the orifices 98 to adjust the flow of clarified liquid 42C into a hollow support 90. The closure can be slidably associated with the settler plate 60. Additionally, or alternatively, the closure can be snapped or frictionally retained on the settler plate. Optionally, the closure may comprise a plug that can be selectively positioned within an orifice 98.

The settler plate 60 can include a flange or baffle 74 that extends from one or both of the lateral sides 72 of the settling surface 62. In one embodiment, the baffle 74 is integrally formed with the settling surface. For example, the baffle can be formed by bending a tab 132 that extends from a lateral side of the settling surface 62 (as generally described in conjunction with FIG. 16). The baffle 74 can be approximately perpendicular to the settling surface 62. Optionally, the baffle 74 extends upwardly above the settling surface 62. In one embodiment, the baffle has a height of between approximately 0.5 inches and approximately 2.0 inches. In one embodiment, the baffle height is approximately 1.8 inches.

Figure 15F:
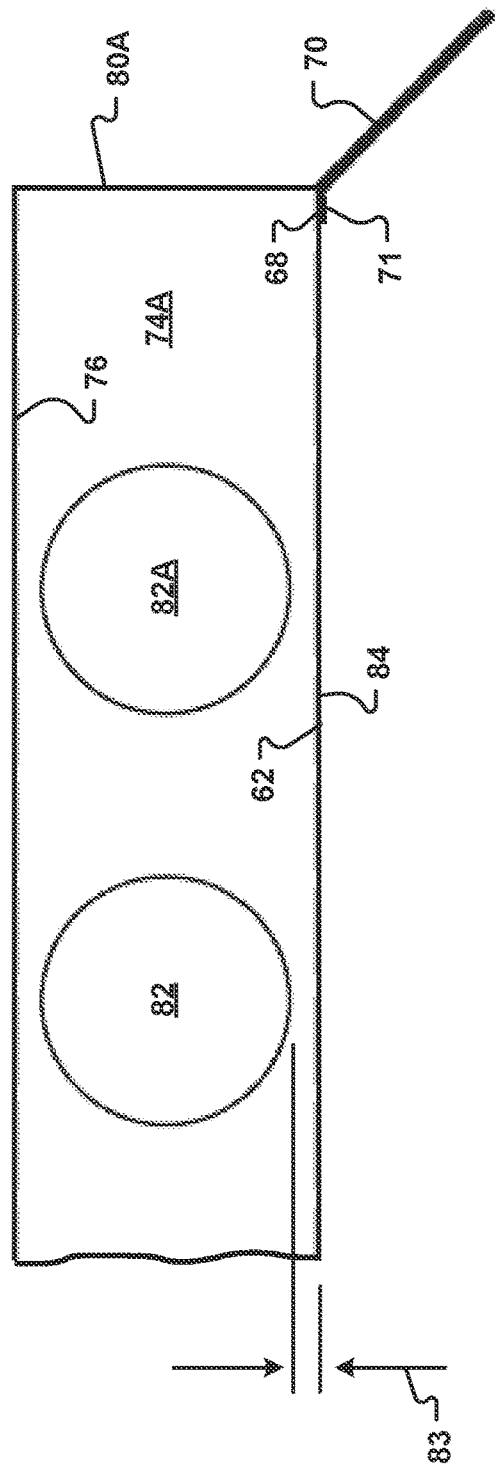
FIG. 15F is another expanded side elevation view of a portion of the settler plate of FIG. 15C illustrating a stiffening feature of one embodiment of the present disclosure.
Figure 15G:
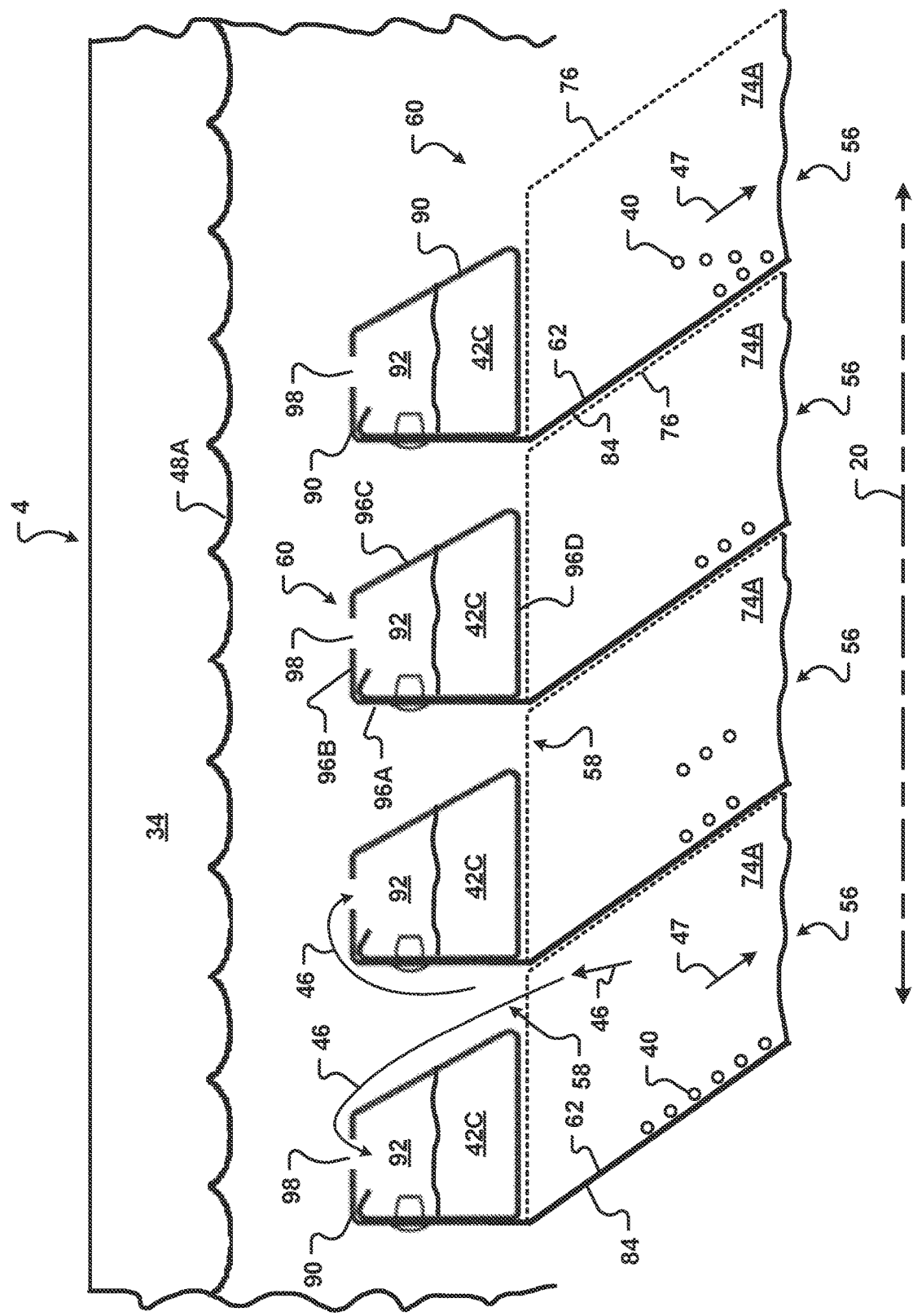
FIG. 15G is a partial side elevation view of upper portions of settler plates of the present disclosure positioned in a detention basin.

A distal portion 76 of the baffle 74 is configured to contact a back surface 84 of an adjacent settler plate as generally illustrated in FIG. 15G. In this manner, the height of the baffle 74 can define a height of a channel 56 between the adjacent settler plates 60.

A flange 78 can extend from the distal portion 76 of the baffle. The flange 78 (best seen in FIG. 15D) can be formed by folding or bending the baffle distal portion 76. In one embodiment, the flange 78 is substantially parallel to the settling surface 62. The flange 78A of a first baffle 74A can extend toward the flange 78B of a second baffle 74B. Accordingly, the flange 78 can extend inwardly above the settling surface 62 of the settler plate 60. Optionally, the flange 78 has a width of between approximately 0.3 inches and approximately 1.8 inches.

The flange 78 is configured to contact a back surface 84 of an adjacent settler plate 60. In one embodiment, the flange 78 is adapted to increase the strength or rigidity of the settler plate 60. Additionally, or alternatively, the flange 78 can distribute the force applied by a settler plate 60 to the back surface of an adjacent settler plate. Accordingly, the flange 78 can reduce damage or unintended bending to the adjacent settler plate. The flange 78 can also help form a seal between adjacent settler plates 60. In this manner, liquid 42 may be prevented from unintentionally entering a channel 56 between adjacent settler plates between a baffle 74 and a back surface 84. Accordingly, the baffle 74 can be used in the clarifier to replace one or more of the partitions 18. The flange 78 can thus improve the efficiency of a settling plate 60.

Optionally, an interior angle between the flange 78 and the baffle 74 can be at least 90°. For example, the interior angle can be between approximately 91° and approximately 95°. In this manner, when the flange is positioned against a settling back 84 of an adjacent settler plate 60, the flange 78 can create a biasing force and form the seal with the adjacent settling surface.

A lower end 80A of the baffle 74 proximate to the lower end 68 of the settling surface 62 may be approximately perpendicular to the settling surface 62 as generally illustrated in FIG. 15F. Optionally, an upper end 80B of the baffle 74 may be angled relative to the settling surface as shown in FIG. 15E. In one embodiment, an interior angle between upper end 80B and the settling surface 62 is between approximately 50° and 60°, or approximately 55°. In one embodiment, the upper end 80B is approximately parallel to the fourth segment 96D. Additionally, or alternatively, the upper end 80B can contact the fourth segment 96D. In this manner, the upper end 80B and the fourth segment can define a seal to prevent or limit the flow of liquid between the fourth segment 96D and the baffle 74.

A port 82 can be formed through the baffle 74. The port has a size and geometry selected to admit liquid 42 with solids 40 into a channel 56 between adjacent settler plates 60 at a predetermined rate. In one embodiment, each baffle 74 has two or more ports 82.

The port 82 is generally positioned closer to the lower end 80A than to the upper end 80B of the baffle. For example, a port 82 can be positioned at least approximately 1 inch from the lower end 80A. Placing the port 82 closer to the lower end 80A is beneficial because floating debris, such as leaves, plastic, oil, grease, and similar debris will generally be at a level in the detention basin that is higher than the ports 82. Accordingly, floating debris is unlikely to pass through the ports 82 and enter the channel 56 between the settler plates 60.

The port 82 may have any shape. Optionally, the port 82 is square or rectangular as described in conjunction with FIG. 4F. In one embodiment, each baffle 74 has at two or more rectangular ports 82 as shown in FIG. 4C. Additionally, or alternatively, in one embodiment, the port 82 of the settler plate 60 has a round shape or circular as generally illustrated in FIG. 15F. In one embodiment, each baffle 74 can include up to eight ports 82. Optionally, each baffle has six ports 82.

The port 82 can have a width or diameter of between approximately 0.25 inches and approximately 2 inches. Optionally, the port 82 has a diameter of approximately 1.5 inches. A lower or first port 82 can be centered between approximately 2.4 inches and 2.5 inches from the lower end 80A of the baffle 72. In this manner, liquid 42 with solids 40 can enter the channel 56 between adjacent settler plates a predetermined distance from the lower end 68 of the settler place to avoid drawing settled solids 40 back into a channel or disturbing the downward movement of the solids. Additional ports 82 may be centered about 2.5 inches upwardly from a lower or first port 82A.

The ports 82 can have different sizes. For example, in one embodiment the first port 82A proximate to the lower end 80A has a larger size than a second port 82 positioned further from the baffle end 80A. In one embodiment, each successive port 82 can decrease in size as the distance from the lower end 80A increases. Forming a plurality of ports 82 with graduated sizes can enhance the flow characteristics of liquid 42 entering a channel 56. For example, the graduated ports 82 can reduce turbulence (or eddy currents, changes in flow direction or velocity) in the flow of liquid 42 within the channel 56 improving the rate at which solids 40 settle out of the liquid 42 and thereby increasing the efficiency of the clarifier 2.

The port 82 can be formed through the baffle 74 in a position so that, when the settler plate 60 is arranged in the clarifier 2 or plate pack 50, liquid 42 containing the solid 40 impurities (as an influent) is introduced into the channel 56 above solid particles 40 which have already separated from the liquid 42 and have settled on (or are sliding down) the settling surface 62. Accordingly, in one embodiment, the port 82 is spaced a predetermined distance 83 above the settling surface 62 on the baffle 74. Optionally, the distance 83 between the port 82 and the settling surface 62 is at least approximately 0.1 inches, or approximately 0.19 inches. Positioning the port 82 in this manner is beneficial because the liquid 42 with the solids 40 can be introduced into the channel 56 in a manner which inhibits (and preferably, prevents) disrupting or disturbing solids 40 that have already separated from liquid 42 in the channel. More specifically, by spacing the port 82 from the settling surface, turbulence or eddy currents at or near a settling surface 62 of the settler plate 60 that results from the flow of liquid 42 through the port into a channel 56 can be reduced. Reducing turbulence near the settling surface 62 can increase the speed at which the solids 40 settle out of the liquid 42, increasing the efficiency of the settler plate of the present disclosure.

Referring now to FIG. 15F, a stiffening feature 70 can optionally extend from the lower end 68 of the settling surface 62. The stiffening feature helps prevent or reduce bending or warping of the settling surface.

Figure 16:
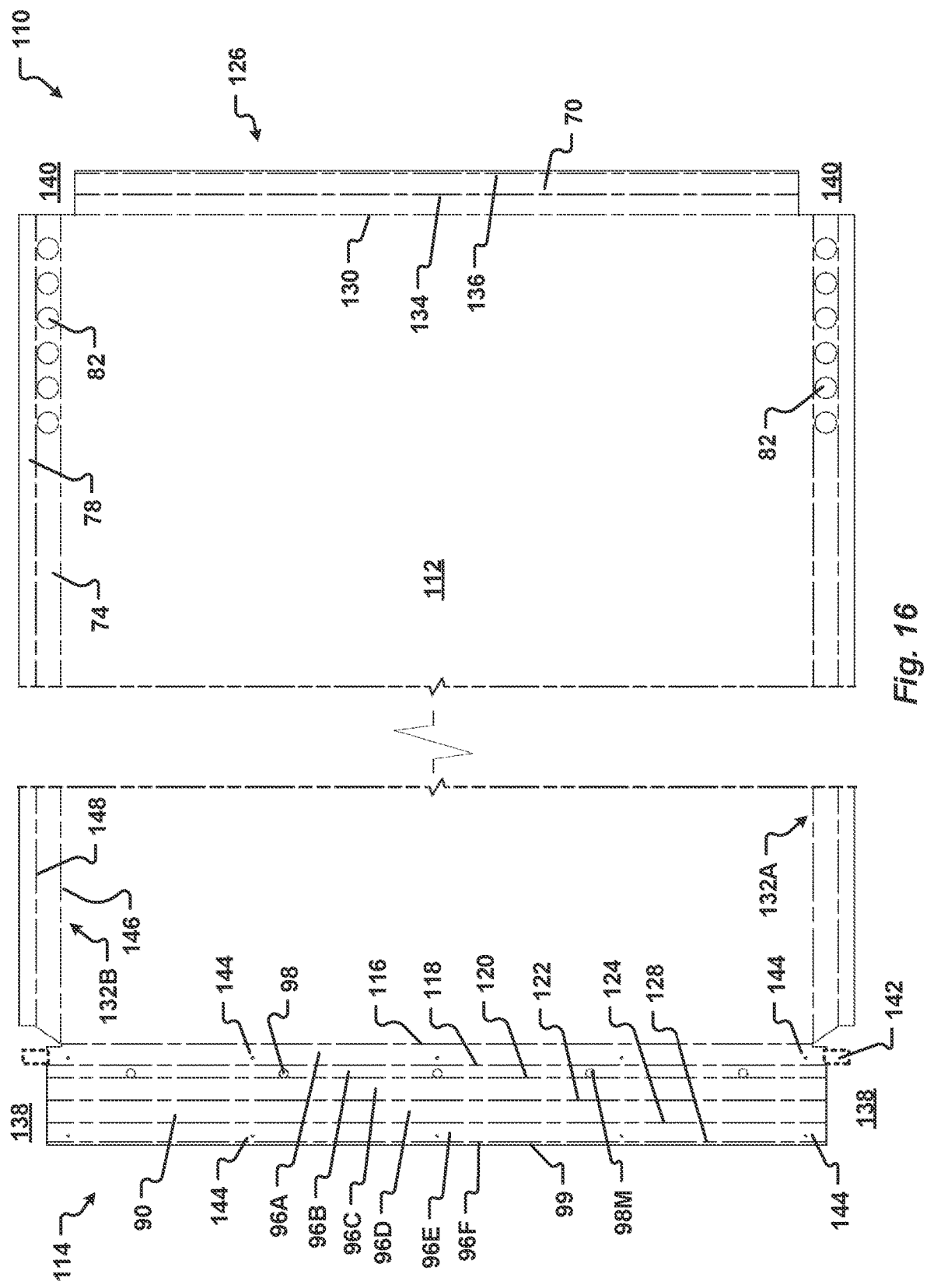
FIG. 16 is a top plan view of a blank of the present disclosure that can be formed into a settler plate according to the embodiment of FIG. 15.

In one embodiment, the stiffening feature 70 is integrally formed with the settling surface. For example, the stiffening feature 70 can be formed by bending or rolling a tab 126 (such as illustrated in FIG. 16) extending from the settling surface 62. The stiffening feature 70 can be oriented at a predetermined angle below the settling surface. Optionally, the stiffening feature extends below the settling surface at an angle of between approximately 40° and approximately 50°, or approximately 44°. In this manner, when a settler plate 60 is positioned in a plate pack 50 or clarifier 2, the stiffening feature can be oriented approximately vertically.

The stiffening feature 70 can be of any size and shape. The stiffening feature 70 can be formed by bending a tab 126 of a blank 110 two or more times. In one embodiment, the stiffening feature 70 is generally flat. For example, the stiffening feature 70 can be formed by bending a first portion of the tab against a second portion of the tab such as in the embodiment illustrated in FIG. 15F. Accordingly, the stiffening feature 70 illustrated in FIG. 15F can comprise two or more layers or thicknesses of a blank 110 from which the settler plate 60 is formed.

Referring now to FIG. 15G, the settler plates 60 can be spaced along the longitudinal axis 20 of the basin 4. Each of the adjacent hollow supports 90 is shown carrying one of the settler plates 60 such that the settling surfaces 62 are substantially parallel. The settler plates 60 can be arranged adjacent to each other and together define channels 56 between the adjacent settler plates 60. The baffles 74 (illustrated in broken lines for clarity) of the settler plates contact the back surfaces 84 of adjacent settler places to form a wall. The wall formed by the baffles causes the liquid 42 to enter the channels 56 through the side ports 82. More specifically, the baffles prevent liquid 42 from unintentionally flowing laterally into the channels and causes influent to enter the channels through the side ports 82. Introducing the influent flow across the settler plates 60 from the lateral sides through the port 82 allows the down-flowing sludge and solids 40 to fall below the channels 56 into a quiet zone in the detention basin 2 beneath the settler plates 60. For example, as shown in FIG. 1, the lower ends 68 of the settler plates are spaced from the bottom 14 of the basin. The area between the plate lower ends 68 and the basin bottom 14 forms a "quiet zone" with little movement or turbulence in the liquid. By limiting the introduction of liquid 42 into the channels 56 through the side ports 82, the settler plates 60 of all embodiments of the present disclosure ensure minimum interference with the downward movement of solids 40 to the basin bottom 14 where the solids can be collected.

In contrast, some prior art settler plates are designed to introduce liquid into a channel between adjacent settler plates from the bottom, which can interfere with the downward movement of solids. The liquid flowing into the channels from the bottom of the settler plates may cause solids to move upwardly in the basin rather than downwardly as intended.

As the solids 40 and the liquid 42 flow upwardly from the ports 82 within the channels 56 (as generally illustrated in FIGS. 4G and 5), the solids 40 settle from the liquid 42 onto the settling surface 62. The solids 40 then slide down the settling surface to the bottom 14 of the basin 4 as generally indicated by arrows 47. The clarified liquid 42C continues to flow upwardly to an outlet 58 extending between a hollow support 90 of one settler plate and a hollow support of an adjacent settler plate. Optionally, the outlet 58 can have a width of between approximately 0.10 inches and 0.50 inches, or between approximately 0.25 inches and approximately 0.375 inches.

In one embodiment, in which the orifices 98 are formed in the second segment 96B, the clarified liquid 42C can flow above the second segment 96B of the hollow support. The clarified liquid 42C can assume a level 48A in the basin 4 above the second segment 96B of the hollow support 90. Accordingly, there may be some commingling of clarified liquid 42C from one channel 56 with clarified liquid from another flow channel.

The level 48A of the clarified liquid 42C can be controlled by adjusting the position of a weir 30 (such as described in conjunction with FIG. 5) upwardly or downwardly. By changing the position of the weir, the level 48A of clarified liquid 42C can be adjusted to be between approximately 0.25 inches to at least approximately 6 inches above the top surface of the second segment 96B. Submerging the settler plates 60 and the hollow supports 90 in this manner can beneficially eliminate an air/water interface and thereby prevent or reduce corrosion of the settler plates. Forming a volume of clarified liquid 42C above the hollow supports 90 can also create a pressure head above the settler plates 60 and improves the flow of the clarified liquid into the hollow supports. For example, the clarified liquid 42C flowing through the orifices 98 can create a substantially uniform headloss across the width 64 of the settling surface 62. The substantially uniform headloss in turn provides an even flow of liquid upwardly through the channels 56 between the settler plates. In one embodiment, the flow of clarified liquid 42C into the hollow supports 90 reduces the pressure head by up to approximately 0.5 inches.

One the clarified liquid 42C enters the hollow interior 92 of the hollow support 90, the clarified liquid flows laterally out of the hollow support. The liquid 42C may then flow over a weir and into a trough. The trough can then direct the clarified liquid 42C out of the detention basin 4.

Referring now to FIG. 16, a blank 110 of an embodiment of the present disclosure is generally illustrated. The blank 110 can be formed into a settler plate 60 of the embodiments described in conjunction with FIGS. 11-15 of the present disclosure. More specifically, the blank 110 can be used to form a settler plate 60 from a single piece of material and without welding additional material to the settler plate.

In one embodiment, the blank 110 is formed of a 20 to 26 gauge material, or a 24 gauge material. The material of the blank 110 can be a stainless steel alloy, such as a 304 stainless steel alloy. Alternatively, the blank can be formed of carbon steel, aluminum, or bendable plastic, such as Acrylonitrile butadiene styrene (ABS). The blank 110 can have a length of between approximately 90 inches and approximately 140 inches, or approximately 124 inches. A width of the blank can be between approximately 40 inches and approximately 80 inches, or about 60 inches. The blank 110 is generally planar.

The blank 110 generally includes a central sheet 112, a first end tab 114, a second end tab 126 and two lateral tabs 132A, 132B. The central sheet 112 can form a settling surface 62 of a settler plate 60. Notches 138 can be formed between the first end tab 114 and the lateral tabs 132. Similarly, notches 140 can be formed between the second end tab 126 and the lateral tabs. The notches 138, 140 can be provided to facilitate bending of the tabs 114, 126, 132 into predetermined shapes. Ports 82 for effluent can optionally be formed in the blank 110. Although the ports 82 are illustrated with a circular shape, the ports can have any desired shaped, including a square or rectangular shape.

A plurality dashed lines are shown. Each dashed line represents an axis of bending, or bend axis, for a location at which the blank can be bent or folded to form the settler plate 60.

The first end tab 114 generally includes one or more bend axes 116, 118, 120, 122, 124, and optionally 128. The bend axes indicate locations at which the first end tab 114 can be bent to form a hollow support 90, such as generally illustrated in FIG. 15E. More specifically, the axes 116-124 and 128 generally define the first through sixth segments 96A-96F of the hollow support 90.

Optionally, one or more orifices 98 can be formed in the first end tab 114. In one embodiment, at least one orifice 98 is formed between the second bend axis 118 and the third bend axis 120.

In one embodiment, positions 144 for fasteners, such as rivets, are indicated on the first end tab 114. The fastener positions 144 may be between the first and second bend axis 116, 118 and between the fifth and sixth bend axis 124, 128. Optionally, the fastener positions 144 may be a hole through the blank 110.

The hollow support 90 can be formed by bending the first end tab 114 proximate to the bend axes 116-124 and 128. Any bending or folding apparatus can be used. One example of a suitable folding machine that can be used to form a blank 110 into a settler plate 60 is an RAS XLTbend. Other suitable folding machines are known to those of skill in the art.

In one embodiment, the hollow support 90 of the embodiment generally illustrated in FIG. 15E is formed by bending an outer portion of the first end tab 114 around the sixth axis 128 to define the sixth segment 96F. The first end tab 114 can be bent or folded upwardly at an angle of approximately 35° at the six axis 128.

The first end tab 114 is then bent upwardly by approximately 90° at the fifth bend axis. In this manner, the fifth segment 96E is formed.

The first end tab 114 can also be bent or folded at the fourth axis 122 to define the fourth segment 96D. Optionally, the first end tab 114 is bent or folded upwardly at an angle of approximately 118° at the fourth axis 122. Similarly, the first end tab 114 can be bent or folded at the third axis 120, the second axis 118, and the first axis 116 to form the third segment 96C, second segment 96B, and the first segment 96A. The first end tab 114 can be bent by approximately 62° at the third axis 120, approximately 90° at the second axis 118, and approximately 35° at the first axis 116. In one embodiment, each bend 116, 118, 120, 122, 124, and 128 has a radius of curvature of approximately 1/16th inch. The bending or folding at the bend axes 116-124 and 128 can be performed in one or more operations.

The second end tab 126 can be formed into a stiffening feature 70 of embodiments of the present disclosure. In one embodiment, the second end tab 126 can be bent or folded down and approximately in half at the eighth bend axis 134, or by approximately 180°. Optionally, the second end tab 126 can be folded in half one or more additional times. The second end tab 126 can next be bent or folded downwardly by approximately 44° at the seventh bend axis 130. In this manner, the stiffening feature 70 of the embodiment illustrated in FIG. 15F can be formed. In one embodiment, the second end tab 126 can first be bent at the ninth bend axis 136 to form a flange 71. In one embodiment, the second end tab 126 is bent two or more times to form the stiffening feature 70.

The lateral tabs 132 can be bent one or more times to form baffles 74 of embodiments of the present disclosure. More specifically, the lateral tabs 132 can be bent or folded by approximately 90° at the tenth axis 146 to define the baffles 74 of the present disclosure. In one embodiment, the lateral tabs 132 are bent or folded by approximately 90° at the eleventh axis 148 to form flanges 78 extending inwardly from the baffles 74.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting.

To provide additional background, context, and to further satisfy the written description requirements of 35 U.S.C. § 112, the following references are incorporated by reference herein in their entireties: U.S. Pat. Nos. 3,963,624; 4,089,782; 4,120,796; 4,136,012; 4,157,969; 4,221,671; 4,889,624; 5,049,278; 5,116,443; 5,378,378; 5,391,306; 6,245,243; 6,783,009; 6,971,398; 7,314,572; 7,850,860; 8,585,896; 8,945,401; 9,327,999; 9,656,188; 9,993,747; U.S. Pat. Pub. 2008/0314823; U.S. Pat. Pub. 2012/0312741; and U.S. Pat. Pub. 2017/0050124.

What is claimed is:

1. An apparatus for clarifying liquid in which solids are suspended, comprising:
a frame; and
a plurality of settler plates spaced along a longitudinal axis of the frame to define a plurality of channels, each of the settler plates including:
a settling surface;
a back surface opposite the settling surface;
a baffle at a lateral side of the settling surface, the baffle extending away from the back surface and above the settling surface; and
a hollow support proximate to an upper end of the baffle, the hollow support being integrally formed with the settling surface, the hollow support extending upwardly above the settling surface and including a hollow interior and at least one orifice configured to receive clarified liquid flowing upwardly from at least some of the plurality of channels to enter into the hollow interior;
wherein the upper end of the baffle contacts a portion of the hollow support,
wherein the upper end is configured to define a seal to prevent or limit a flow of liquid between the portion of the hollow support and the baffle, and
wherein a channel of the plurality of channels is formed in part by a settling surface and a baffle of a first settler plate and a back surface of a second settler plate adjacent to the first settler plate.

2. The apparatus of claim 1, wherein the hollow support further comprises:
a first segment extending from the settling surface;
a second segment extending from the first segment;
a third segment extending from the second segment toward the baffle;
a fourth segment extending from the third segment and proximate to the upper end of the baffle;
a fifth segment extending from the fourth segment, wherein the fifth segment extends along a portion of the first segment; and
a sixth segment extending from the fifth segment, wherein the sixth segment is configured to increase a stiffness of the hollow support.

3. The apparatus of claim 2, wherein:
the second segment is approximately perpendicular to the first segment;
the fourth segment is approximately parallel to the second segment; or
the fifth segment is approximately parallel to the first segment.

4. The apparatus of claim 2, wherein a portion of the fifth segment contacts the first segment, and wherein the first and fifth segments are joined together with at least one of a mechanical fastener, a weld, a glue, an adhesive, or a solder.

5. The apparatus of claim 2, wherein the at least one orifice extends through one or more of the second segment, the first and fifth segments, or the third segment.

6. The apparatus of claim 2, wherein:
the plurality of settler plates are inclined at an angle of between approximately 50° and approximately 60° relative to the longitudinal axis of the frame;
one or more of the second segment or the fourth segment is approximately parallel to the longitudinal axis of the frame; or
one or more of the first segment or the fifth segment is approximately perpendicular to the longitudinal axis of the frame.

7. The apparatus of claim 1, wherein the baffle does not intersect a plane defined by the back surface.

8. The apparatus of claim 1, wherein the baffle includes a flange at a select height above the settling surface, wherein the flange extends inwardly toward a central axis of the settling surface, wherein a flange of the first settler plate contacts the back surface of the second settler plate, wherein a height of the channel between the first settler plate and the second settler plate is defined by a height of the baffle.

9. The apparatus of claim 1, wherein the baffle includes at least one port formed proximate to a lower end of the baffle, the location of the at least one port being a select distance from the lower end of the baffle and a select height above the settling surface, the at least one port having a shape that is generally circular, rectangular, or square.

10. The apparatus of claim 9, wherein the at least one port includes at least a first port and a second port, the first port having a first size and the second port having a second size.

11. The apparatus of claim 9, further comprising a trough, wherein the at least one port in the baffle is configured to receive influent including liquid in which solids are suspended, wherein the channel formed by the first settler plate and the second settler plate is configured to transport the influent, wherein the settling surface is configured to receive the solids separating from the liquid to form the clarified liquid as the influent travels up the channel, wherein the hollow interior of the hollow support is configured to receive and transport the clarified liquid laterally to the trough.

12. A settler plate, comprising:
a settling surface that is substantially rectangular and planar;
a back surface opposite to the settling surface;
a baffle at a lateral side of the settler plate, the baffle extending away from the back surface and upwardly above the settling surface;
a hollow support proximate to an upper end of the settler plate, the hollow support extending from the settling surface and including:
a hollow interior to transport clarified liquid laterally; and
at least one orifice for liquid to enter the hollow support, wherein the baffle comprises an upper end which contacts a portion of the hollow support, the upper end of the baffle being configured to define a seal to prevent or limit a flow of liquid between the portion of the hollow support and the baffle.

13. The settler plate of claim 12, wherein the at least one orifice includes a plurality of orifices, the plurality of orifices being evenly spaced across a width of the hollow support.

14. The settler plate of claim 12, further comprising a stiffening feature proximate to a lower end of the settler plate, wherein the hollow support extends upward from and does not intersect with a plane defined by the back surface, and wherein the stiffening feature extends downward from and intersects with the plane defined by the back surface.

15. The settler plate of claim 12, wherein the baffle includes a flange, and wherein an internal angle between the flange and the baffle is at least 90°.

16. The settler plate of claim 12, further comprising a second baffle at a second lateral side of the settler plate, the second baffle extending away from the back surface and upwardly above the settling surface, wherein the settling surface is at least partially surrounded by the baffle and the second baffle.

17. The settler plate of claim 12, wherein the hollow support comprises a first segment extending from the settling surface, wherein an interior angle between the settling surface and the first segment is between approximately 130° and approximately 160°.

18. The settler plate of claim 17, wherein the hollow support further comprises:
a second segment extending from the first segment, the second segment oriented approximately perpendicular to the first segment;
a third segment extending from the second segment toward the baffle, wherein an interior angle between the second segment and the third segment is between approximately 115° and approximately 121°;
a fourth segment extending from the third segment and proximate to the upper end of the baffle, wherein an interior angle between the third segment and the fourth segment is between approximately 59° and 65°;
a fifth segment extending from the fourth segment; and
a sixth segment extending from the fifth segment, wherein an interior angle between the fifth segment and the sixth segment is between approximately 25° and 65°, wherein the sixth segment is configured to increase a stiffness of the hollow support.

19. A method of forming a settler plate, comprising:
providing a blank of a metallic material, the blank including an end tab and lateral tabs;
bending the end tab at least two times to form a hollow support that extends from a settling surface of the settler plate, the hollow support including at least one orifice for liquid to enter a hollow interior of the hollow support, wherein a free end of the blank is positioned in the hollow interior of the hollow support and is oriented transverse to the settling surface; and
bending the lateral tabs upwardly to form a baffle at each lateral side of the settler plate, the baffles extending away from a back surface of the settler plate and upwardly above the settling surface, wherein the baffles comprise upper ends which contact a portion of the hollow support, the upper ends being configured to define a seal to prevent or limit a flow of liquid between the portion of the hollow support and the baffles.

20. The method of claim 19, further comprising:
bending the end tab upwardly between approximately 20° and 50° to form a first segment of the hollow support, the first segment extending from the settling surface;
bending the end tab upwardly approximately 90° to form a second segment of the hollow support that extends from the first segment;
bending the end tab upwardly between approximately 59° and 65° to form a third segment of the hollow support that extends from the second segment;

bending the end tab upwardly approximately 115° and 121° to form a fourth segment of the hollow support that extends from the third segment;

bending the end tab upwardly to form a fifth segment of the hollow support that extends from the fourth segment; and bending the end tab upwardly to form a sixth segment of the hollow support that extends from the fifth segment, wherein the sixth segment is configured to increase a stiffness of the hollow support.

* * * * *